United States Patent [19]

Schuler

[11] Patent Number: 4,817,693
[45] Date of Patent: Apr. 4, 1989

[54] MACHINE TOOL EXTENSION TABLE AND METHOD FOR INSTALLING SAME

[76] Inventor: Michael J. Schuler, 1410 N. Broadway, Urbana, Ill. 61801

[21] Appl. No.: 186,800

[22] Filed: Apr. 27, 1988

[51] Int. Cl.⁴ .......................... B27C 9/00; B27B 25/10
[52] U.S. Cl. ...................................... 144/359; 83/471;
83/471.2; 144/134 A; 144/117 R; 144/253 G;
144/286 R; 144/287; 144/363; 144/253 J;
269/236; 269/249; 269/203; 269/303
[58] Field of Search ...................... 83/471, 471.2, 467,
83/648, 574; 144/114 R, 117 R, 134 R, 134 A,
136 R, 253 R, 253 G, 253 J, 286 R, 286 A, 287,
359, 363; 269/236, 249, 203, 303

[56] References Cited

U.S. PATENT DOCUMENTS

| | | | |
|---|---|---|---|
| 746,972 | 12/1903 | Mamsh | 144/287 |
| 1,583,879 | 5/1926 | Hallock | |
| 1,864,840 | 6/1932 | Lehner | |
| 2,555,217 | 5/1951 | Young | 143/132 |
| 2,722,243 | 11/1955 | Nagy | 143/132 |
| 3,406,728 | 10/1968 | Rost | 143/132 |
| 4,068,551 | 1/1978 | Kreitz | 83/471.3 |
| 4,106,381 | 8/1978 | Kreitz | 83/477.2 |
| 4,248,115 | 2/1981 | Brodbeck et al. | 83/435.1 |
| 4,265,284 | 5/1981 | Taylor | 144/287 |
| 4,341,247 | 7/1982 | Price | 144/287 |
| 4,410,023 | 10/1983 | Vasquez | 144/287 |
| 4,566,510 | 1/1986 | Bartlett et al. | 144/1 C |
| 4,627,478 | 12/1986 | Gamble | 144/287 |
| 4,694,720 | 9/1987 | Brickner, Jr. et al. | 83/471.3 |

OTHER PUBLICATIONS

Steton SC 400 NB.
"New Rockwell RE-35 14″ Sliding Table Panel/Scoring Saw", by Rockwell International Corporation (1984).
"KSS3000 14″-16″ Tilting Arbor Sliding Table Panel Saw", by Precision Concepts Corporation (1979).
"The Rockwell Model 12 Panel/Scoring Saw".
Griggio G. & C., "Tenosquadratrice A Lama Inclinabile TS-3000".
"Powermatic Model 74 Sawing Center".
"Universal Woodworking Machine from Felder of Austria", A Test Report by John Sainsbury, Woodworking Crafts, pp. 49-50.
"Combined Machines with 2/4 Works", by Steton.
"6″ and 4″ Deluxe Long-Bed Jointers", by Delta.
"HTC Innovative Shop Solutions" by HTC Products,Inc.
"#3590 10″ Combination Planer/Thicknesser", by DeWalt (1982).
Sicar Surface planers FB400,FB500.
"Sawhelper Ultrafence System 3", by American Design & Engineering Inc. (7/86).
"Product Selection & Pricing Manual" by HTC Products, Inc. (2/85) pp. 1-7.
"A Cut Above", Altendorf product brochure (5/83), pp. 1-23.

Primary Examiner—W. Donald Bray
Attorney, Agent, or Firm—Willian Brinks Olds Hofer Gilson & Lione Ltd.

[57] ABSTRACT

An extension table for a machine tool of the type that includes a machine table that defines a reference plane includes a rigid, straight beam having a lower surface. A ledge is mounted to the lower surface of an outer portion of the beam to extend outwardly from at least one side of the beam, and this ledge defines a continuous upper surface which is substantially coplanar with the lower surface of the beam. The inner portion of the beam is mounted on the machine table with the beam positioned above the machine table such that the outer portion of the beam is cantilevered from the machine table with the lower surface of the beam substantially coplanar with the machine table. The outer portion of the beam is then supported against deflection by a support leg. The beam is sufficiently rigid to ensure that the upper surface of the ledge is substantially coplanar with the machine table. In certain applications the beam is preferably divided into two or more separate beam sections which are held together releasably by coupling elements. A center of one of the beam sections may be affixed to a conventional guide fence of the machine tool to move the extension table laterally across the machine table with the guide fence.

54 Claims, 14 Drawing Sheets

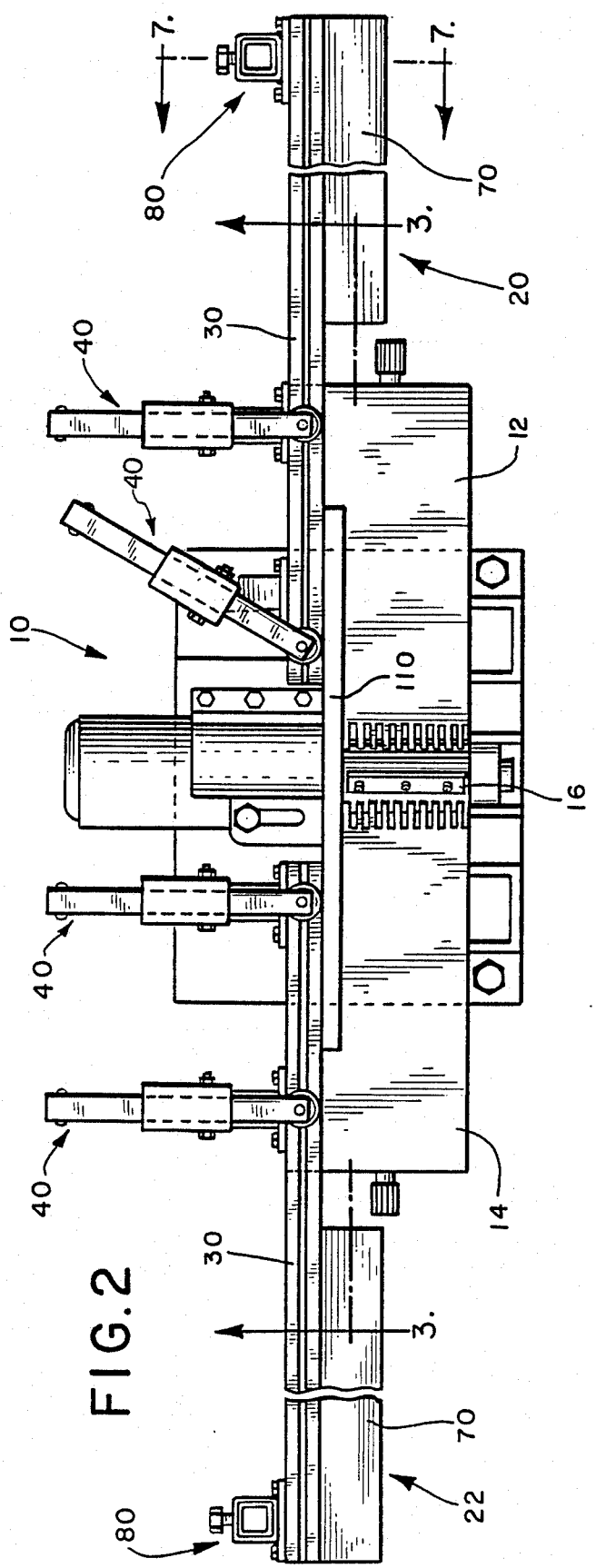
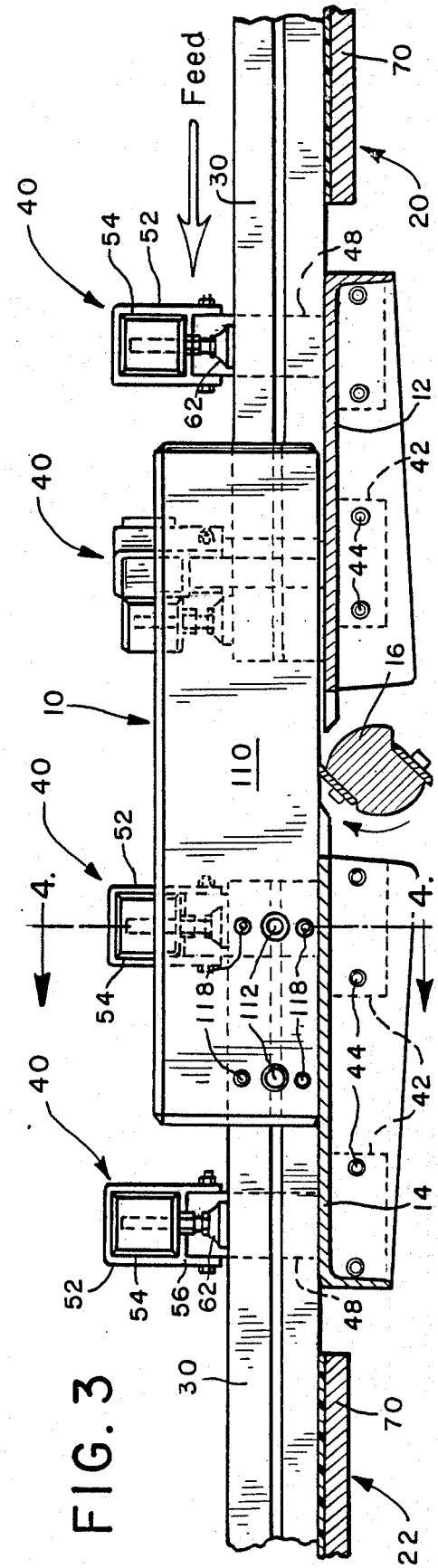

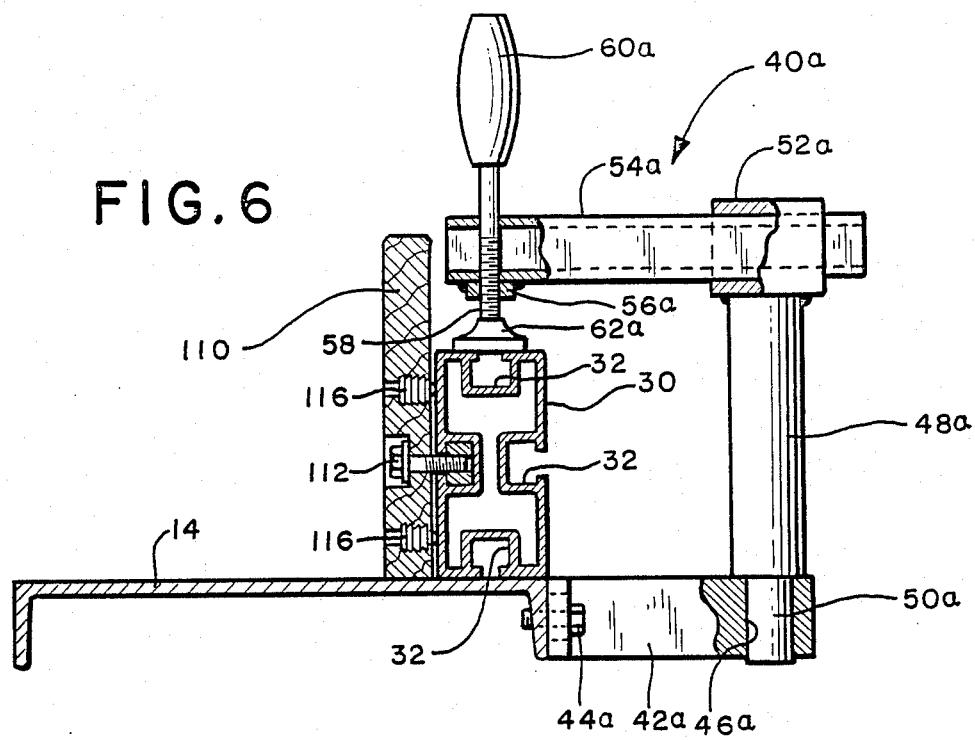
FIG.6
FIG.5
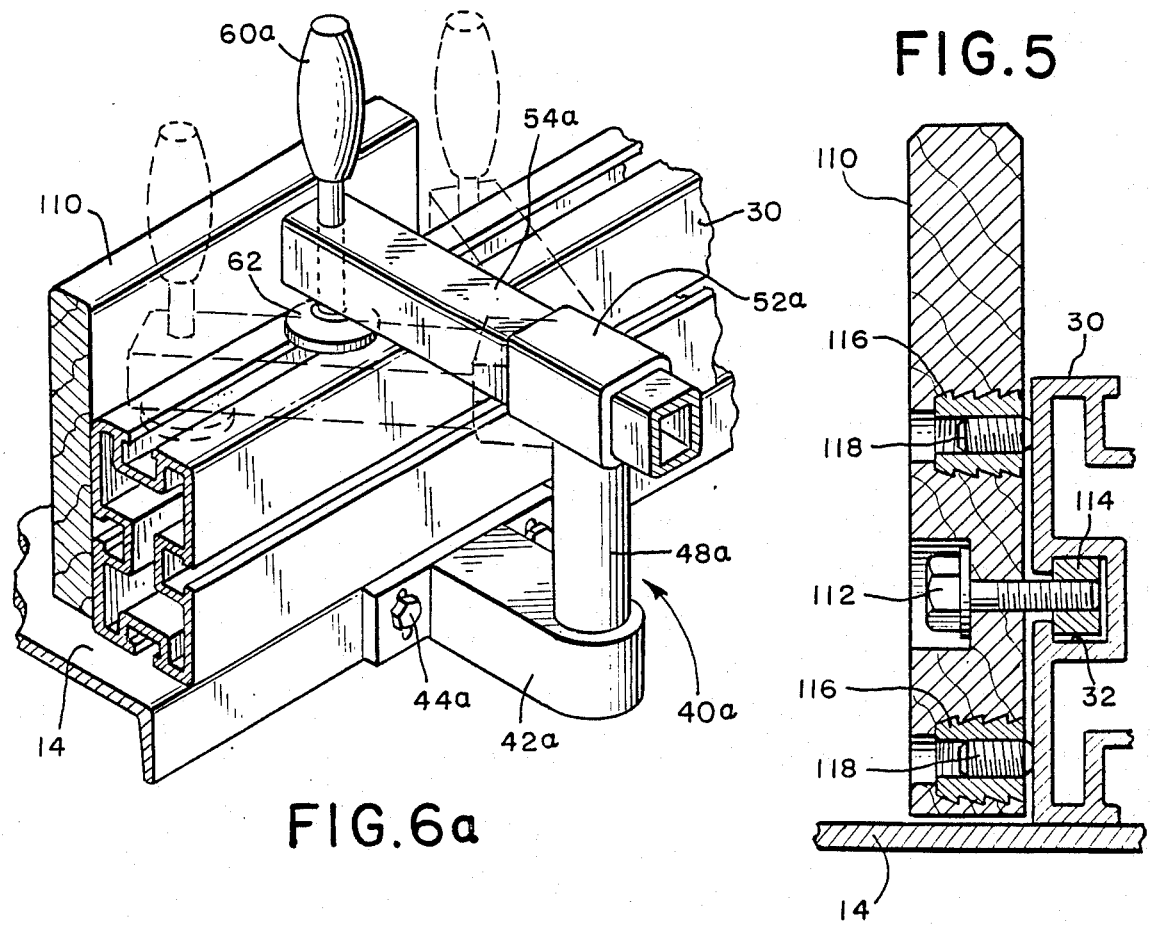
FIG.6a

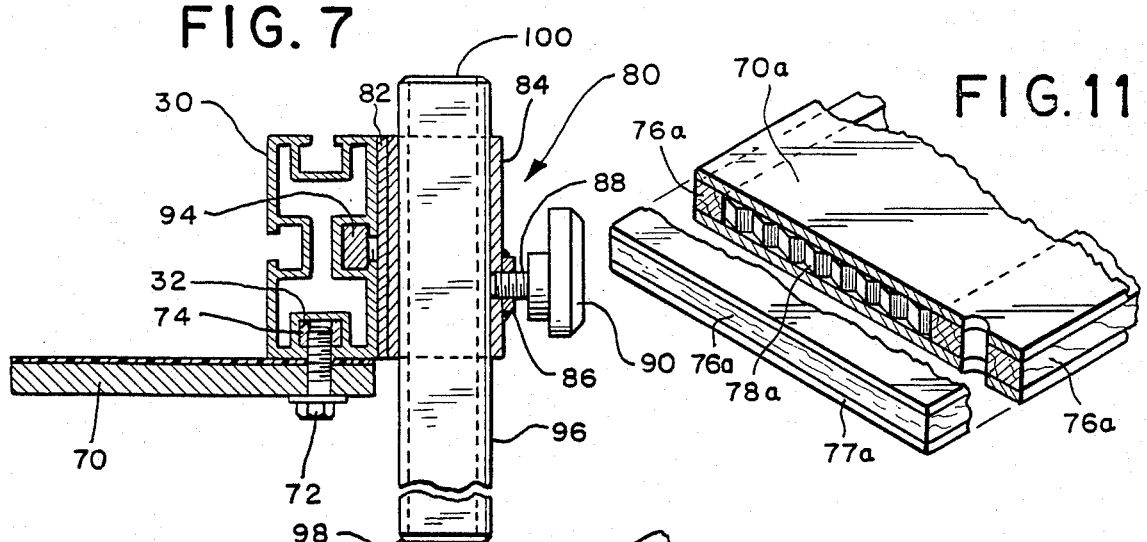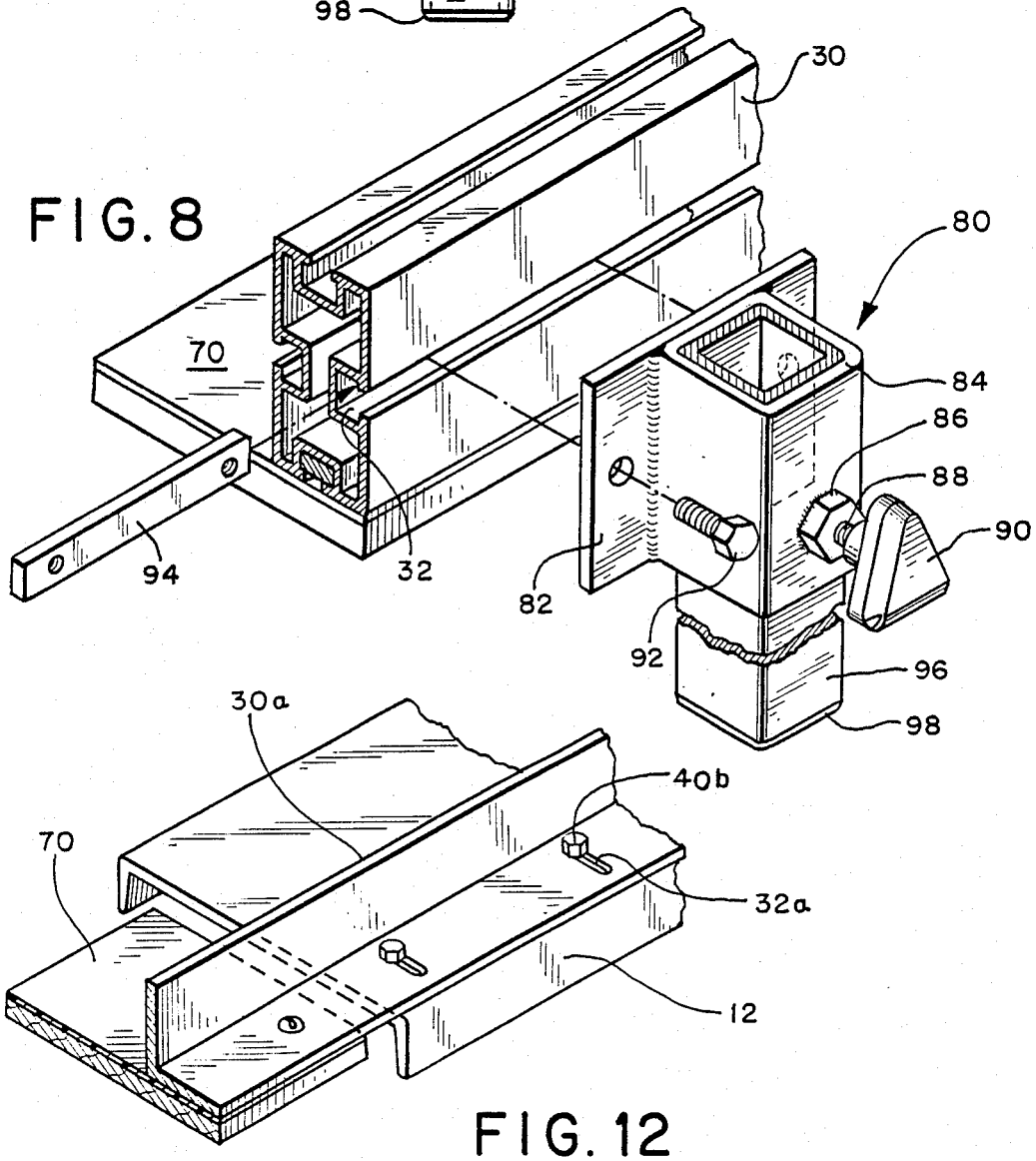

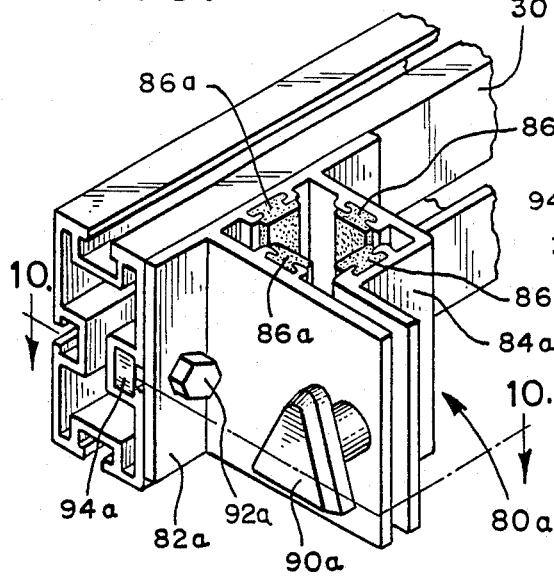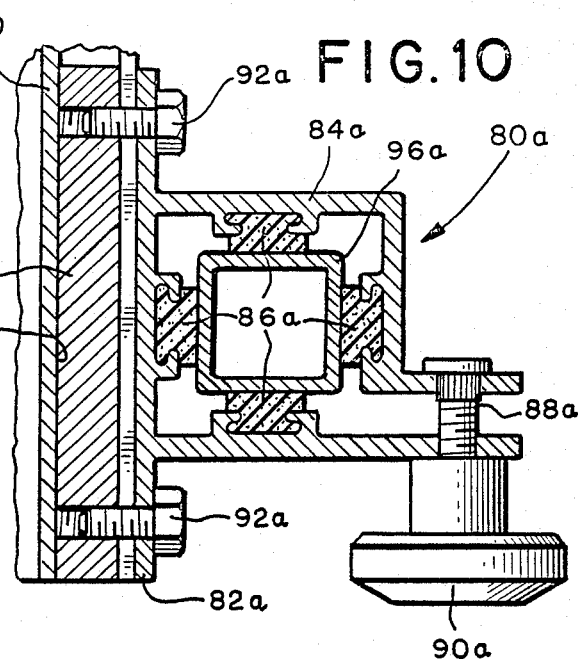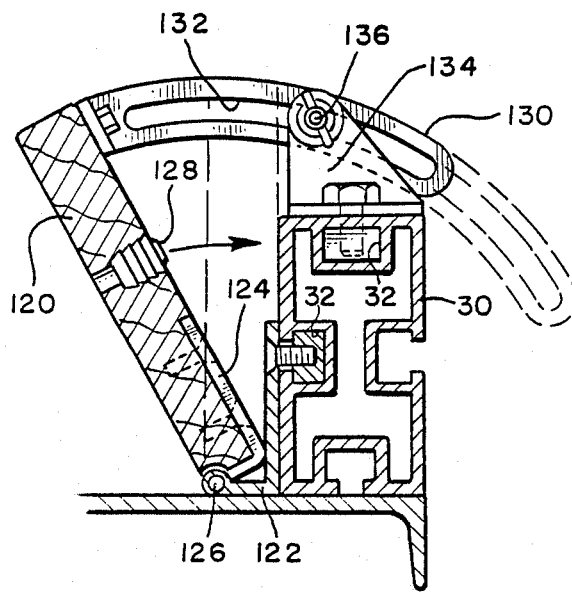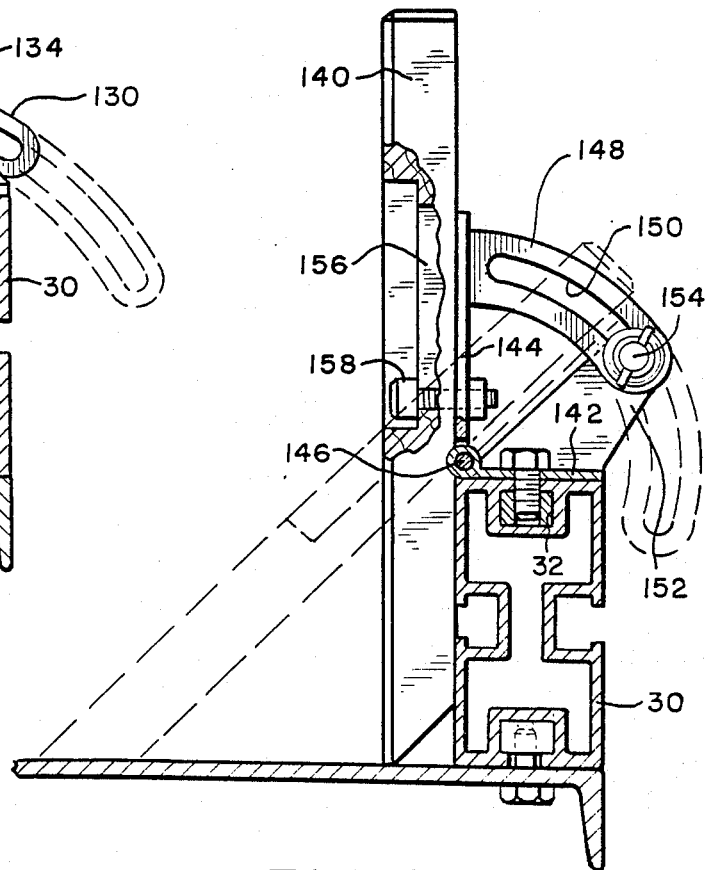

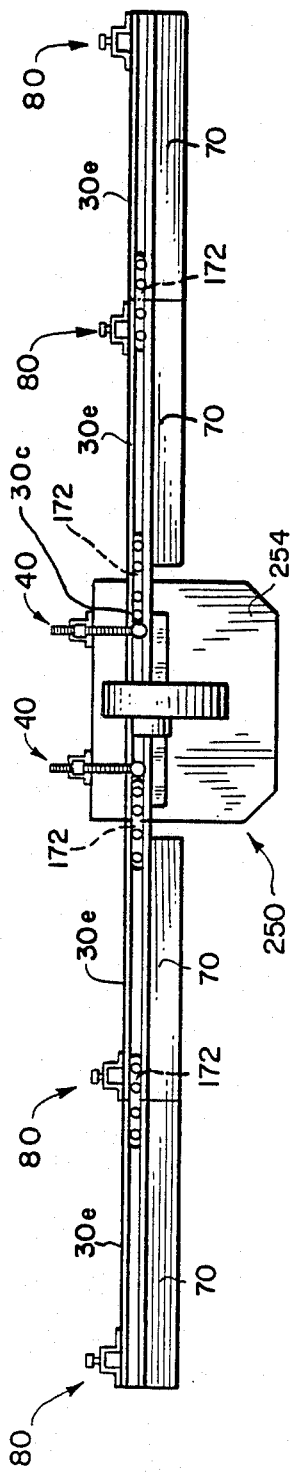
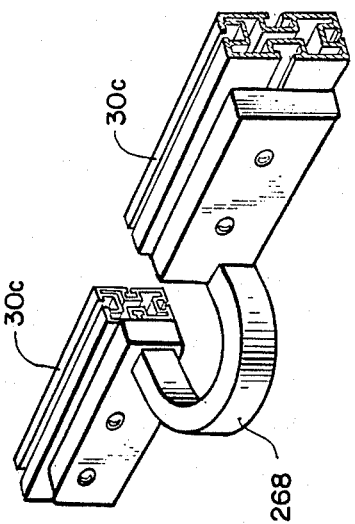
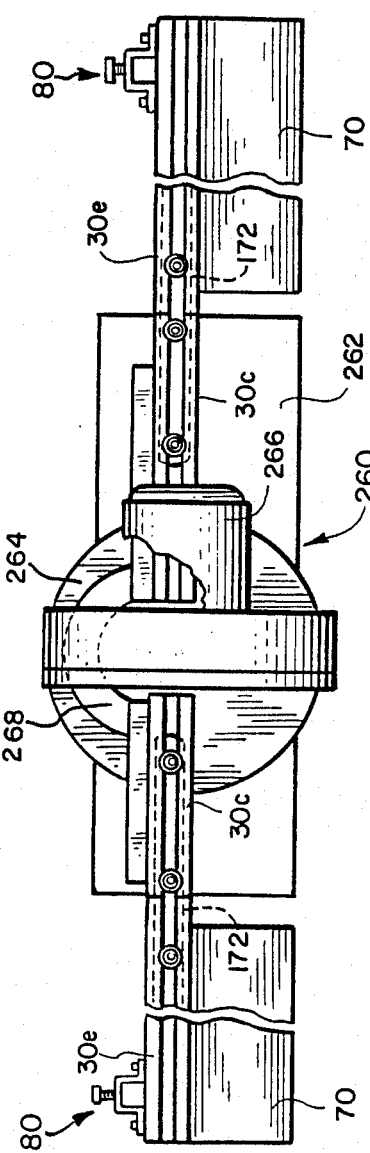

MACHINE TOOL EXTENSION TABLE AND METHOD FOR INSTALLING SAME

BACKGROUND OF THE INVENTION

This invention relates to an extension table suitable for use with a wide range of machine tools, which can easily be installed as needed to support long workpieces.

Stationary machine tools conventionally include at least one machine table, and there have been many attempts in the past to extend such machine tables. A number of previous approaches are illustrated in the following patents:

| U.S.Pat. No. | Inventor(s) |
| --- | --- |
| 1,583,879 | Hallock |
| 1,864,840 | Lehner |
| 2,555,217 | Young |
| 2,722,243 | Nagy |
| 3,406,728 | Rost |
| 4,068,551 | Kreitz |
| 4,106,381 | Kreitz |
| 4,248,115 | Brodbeck, et al. |
| 4,265,284 | Taylor |
| 4,341,247 | Price |
| 4,410,023 | Vasquez |
| 4,566,510 | Bartlett, et al |
| 4,627,478 | Gamble |
| 4,694,720 | Brickner |

The extension tables described by Young, Nagy, Dreitz, Rost, and Price are al secured to the edge of the machine table. Such edge connection does not automatically align the plane of the extension table with the plane of the machine table. For this reason an auxiliary alignment standard, such as a precision straightedge, must be used in order to install the extension table properly. The extension table shown in Brickner is a miter box that actually receives the miter saw. The extension tables or accessories shown in the Bartlett, Taylor, Vasquez, and Gamble patents are all secured to guide bars situated beneath the upper surface of the machine table. Similarly, the extension table shown in Hallock and the workpiece support shown in Lehner are mounted to the underside of the machine table. The Brodbeck sliding table is mounted via a linkage to the base of the machine tool.

These prior art extension tables, though effective for certain applications, all suffer from the disadvantage that they do not in any part extend above the surface of the machine table, and that they do not use the machine table surface as a reference plane to automatically align the extension table with the machine table. Furthermore, since these prior art extension tables mount on the edges, sides, or undersides of the machine tables or bases of the machine tools, the extension table must in each case be designed to accommodate the particular structure of the edge, side or underside of the machine table. In practice, machine tables differ widely in side and underside construction, and it is difficult or impossible to provide a universal mounting structure that will accommodate the wide variety of side and underside table structures in use.

A second characteristic of many prior art extension tables is that they are designed to support the workpiece symmetrically, either across the entire width of the workpiece or along its longitudinal center line. Such symmetrical workpiece support places further constraints on the design and structure of an extension table, constraints which interfere with convenient mounting of such extension tables on many machine tables.

Brodbeck shows in FIGS. 2 and 5 a fence extension 74 designed to telescope into the main fence 70 on the sliding table. This fence extension extends a short distance beyond the sliding table and includes a tab at its extreme end. The Brodbeck patent is assigned to Rockwell International Corporation, and the Rockwell Model 12 Panel/Scoring Saw resembles the saw shown in Brodbeck. Brochures for the Model 12 state that the fence extension helps support extra long stock.

The fence extension of Brodbeck is severely limited in application. First, it is cantilevered from a sliding table without free end support. This lack of support limits the effective length of the fence extension and places large demands on the stability of the machine tool. A heavy load on the fence extension tends to tip the machine tool. Since the fence extension must travel with the sliding table as the workpiece is cut, any support that contacts the floor is effectively eliminated. Second, the Brodbeck fence extension provides little more than point support to the workpiece. Such point support is completely inadequate for applications such as a jointer in which the workpiece is moved longitudinally along the support. On the infeed side, workpiece support provided by a tab such as that of Brodbeck will suddenly disappear as the trailing edge of the workpiece loses contact with the tab; on the outfeed side, the leading edge of the workpiece may sag and snag against the tab. Also the position of the tab must be adjusted for workpieces of varying lengths.

The present invention is directed to an improved extension table which can easily be mounted to almost any machine table and can readily be moved from one machine tool to another.

It is another object of this invention to provide such an extension table which automatically extends the plane of the machine table such that no auxiliary straight edge is required for proper alignment of the extension table, and which is adequately supported against deflection under load.

It is another object of this invention to provide such an extension table which maintains proper alignment with the machine table as the extension table is moved laterally across the machine table, or as the machine table is moved vertically.

It is yet another object of this invention to provide a self aligning extension table which provides continuous support to a workpiece as the workpiece slides on the extension table.

SUMMARY OF THE INVENTION

This invention provides an extension table for a machine tool of the type that comprises a machine table that defines a reference plane. The extension table of this invention comprises a beam having a lower surface that in turn defines a beam plane. A ledge is mounted to the lower surface of an outer portion of the beam to extend outwardly from at least one side of the beam. This ledge defines an upper surface that is substantially parallel with the beam plane. Means are provided for mounting an inner portion of the beam on the machine table with the beam positioned above the reference plane such that the outer portion of the beam is cantilevered from the machine table with the beam plane substantially parallel with the reference plane. The beam has sufficient rigidity to ensure that the upper surface of the ledge is maintained substantially coplanar with the reference plane when the beam is loaded only with the ledge.

According to one feature of this invention, the machine table is of the type that is stationary in use and the beam is supported by a leg that prevents the beam from deflecting under load. This leg ensures that proper alignment of the beam is maintained during use, and it stabilizes the machine tool against tipping.

According to another feature of this invention, the beam and ledge are oriented parallel to the feed direction of the machine tool and the ledge has a length of at least about two feet along the feed direction. This arrangement provides continuous support to the workpiece as it is moved along the ledge.

According to the method of this invention, an extension table is first mounted to the machine table to align the ledge with the machine table automatically. Then a leg is secured to the beam to maintain this alignment under load. In this way the advantages of the leg are obtained without requiring an auxiliary straightedge for alignment of the extension table.

This invention provides a quick, accurate, compact and economical means for extending the basic machine table. By mounting a straight and rigid beam directly to the upper surface of the machine table to be extended, the plane of the machine table is automatically projected by the underside of the beam where it is cantilevered from the machine table. Because the ledge is secured to the underside of the beam, the ledge forms an extension of the machine table surface which is automatically coplanar with the machine table surface. The adjustable support leg at the free end of the beam resists any deflection of the beam under load.

The automatically aligning extension table of this invention is of particular utility when employed with machines having tables that undergo frequent height adjustment, as for example jointers or surface planers used in woodworking. In other applications the beam can be secured directly to the guide fence of the machine tool. In these applications the beam and the ledge automatically move with any lateral adjustment of the guide fence, thereby maintaining a constant relationship between the reference edge of the workpiece and the ledge. At the same time, the tendency of the extension table to obstruct normal machine operation is minimized.

The extension table of this invention can be used on an extremely wide variety of machine tools, since the beam is mounted above the planar machine table. Substantially all conventional machine tools use planar machine tables which can be adapted to support the beam (and therefore the ledge) of the extension table of this invention. Simply by way of example, the extension tables of this invention can be adapted for use on jointers, surface planers, table saws, band saws, band resaws, radial arm saws, miter saws, shapers, router tables, pin routers and drill presses.

As described below, the preferred embodiments of the extension table of this invention are constructed of light weight, compact, separable and modular components. For this reason these embodiments are easily portable and quickly deployed, both in the work shop and on the job site. The extension tables described below are easily stored and transported, and they improve accuracy and safety of operation. Components of these extension tables can be moved from one machine tool to another, thereby minimizing cost and space requirements. These extension tables are particularly well suited for use with job site stationary machines, which must be compact and light weight in order to be sufficiently portable to be brought to the job site.

The invention itself, together with further objects and attendant advantages, will best be understood by reference to the following detailed description, taken in conjunction with the accompanying drawings.

BRIEF DESCRIPTION OF THE DRAWINGS

FIG. 2 is a top plan view of the embodiment of FIG. 1.

FIG. 3 is partial sectional view taken along line 3—3 of FIG. 2.

FIG. 5 is an enlarged sectional view of a portion of the fence and support beam of FIG. 4.

FIG. 6 is a cross sectional view of an alternate clamping means to that shown in FIG. 4.

FIG. 6a is a fragmentary perspective view of the components of FIG. 6.

FIG. 7 is a cross sectional view taken along line 7—7 of FIG. 2.

FIG. 8 is a fragmentary exploded perspective view of the components of FIG. 7.

FIG. 9 is a fragmentary perspective view of an alternative leg clamp suitable for use with the embodiment of FIG. 1.

FIG. 10 is a cross sectional view taken along line 10—10 of FIG. 9.

FIG. 11 is a fragmentary perspective view in partial cutaway of an alternative ledge suitable for use in the embodiment of FIG. 1.

FIG. 12 is a perspective view of an alternate beam suitable for use in the embodiment of FIG. 1.

FIG. 13 is a fragmentary cross sectional view of a second fence suitable for use in the embodiment of FIG. 1.

FIG. 14 is a fragmentary sectional view of a third fence suitable for use in the embodiment of FIG. 1.

FIG. 26 is a top plan view of a preferred embodiment of the extension table of this invention mounted on a radial arm saw.

FIG. 28 is a top plan view of a preferred embodiment of the extension table of this invention mounted on a miter saw.

FIG. 29 is a partial perspective view of the fence support structure of the miter saw of FIG. 28.

DETAILED DESCRIPTION OF THE PRESENTLY PREFERRED EMBODIMENTS

JOINTER APPLICATIONS

Figure 1:
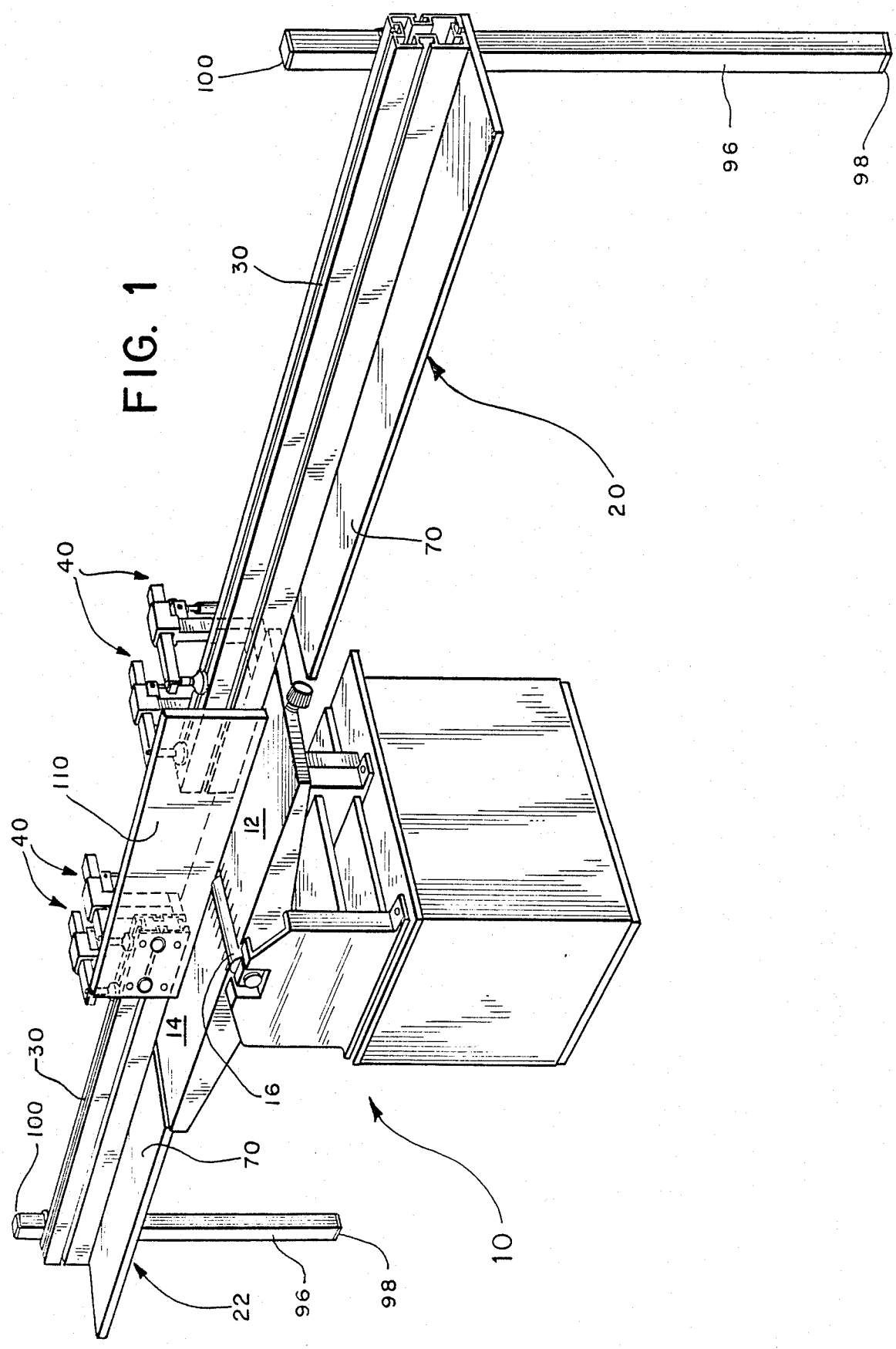
FIG. 1 is a perspective view of a preferred embodiment of the extension table of this invention mounted on a jointer.

Turning now to the drawings, FIG. 1 shows a perspective view of a jointer or surface planer 10 on which is mounted presently preferred embodiments of the extension table of this invention. The jointer 10 is a conventional device which as usual includes an infeed table 12, an outfeed table 14, and a rotatable cutterhead 16. The depth of cut taken by the cutterhead 16 can be controlled by adjusting the height of the infeed table 12 with respect to the outfeed table 14. Each of the tables 12, 14 has a planar upper surface that defines a respective reference plane.

As shown in FIGS. 1-3, an infeed extension table 20 is secured to the infeed table 12 and an outfeed extension table 22 is secured to the outfeed table 14. The infeed and outfeed extension tables 20, 22 are made of the same components, and for simplicity only the infeed extension table 20 will be described in detail. However, this description is directly applicable to the outfeed extension table 22 as well.

The infeed extension table 20 is made up of a rigid beam 30, a pair of clamp assemblies 40 which clamp the beam 30 to the infeed table 12, a ledge 70 which is secured to the beam 30, and a leg clamping bracket 80 which adjustably secures a leg 96 to the beam 30. Each of these components will now be described in detail.

The beam 30 is straight and sufficiently rigid to resist deflection when loaded with the ledge 70, the leg bracket 80, and the leg 96, and also sufficiently rigid to resist twisting caused by the load of the workpiece on the ledge 70. In this preferred embodiment the beam 30 is a light weight aluminum extrusion which has been hard anodized to reduce wear of the beam 30 and discoloration of the workpiece. As shown for example in FIG. 4 the beam 30 is generally rectangular in cross section and defines four T slots 32, one positioned on each face of the beam 30. The lower surface of the beam 30 is planar and defines a beam plane.

In this preferred embodiment the beam 30 is 3 inches in height and 1½ inch in width, and the beam extrusion defines a wall thickness of ⅛ inch. The T slots in this embodiment are sized to receive standard ⅜ inch by 16 machine bolts. Of course, the dimensions of the beam 30 will vary widely depending on the application, and can easily range as small as a cross section of 1 inch by 1 inch or smaller, or as large as a cross section of 8 inch by 6 inch or larger. In all cases wall thickness should be sized accordingly.

The beam 30 is not limited to the illustrated form and can alternately have an L-shaped cross section as shown at reference numeral 30a in FIG. 12. Alternately a simple box extrusion can be used. In addition, other materials than aluminum can be used, including plastic extrusions, hollow core wood structures, plastic laminated veneered sections and precision machine castings.

As best shown in FIGS. 1-3, the inner end of the beam 30 is clamped onto the machine table 12 by two clamp assemblies 40. In this embodiment the beam 30 rests directly upon the machine table 12 and is cantilevered beyond the machine table with preferably at least one quarter of the overall length of the beam 30 overlapping and resting on the machine table 12.

Figure 4:
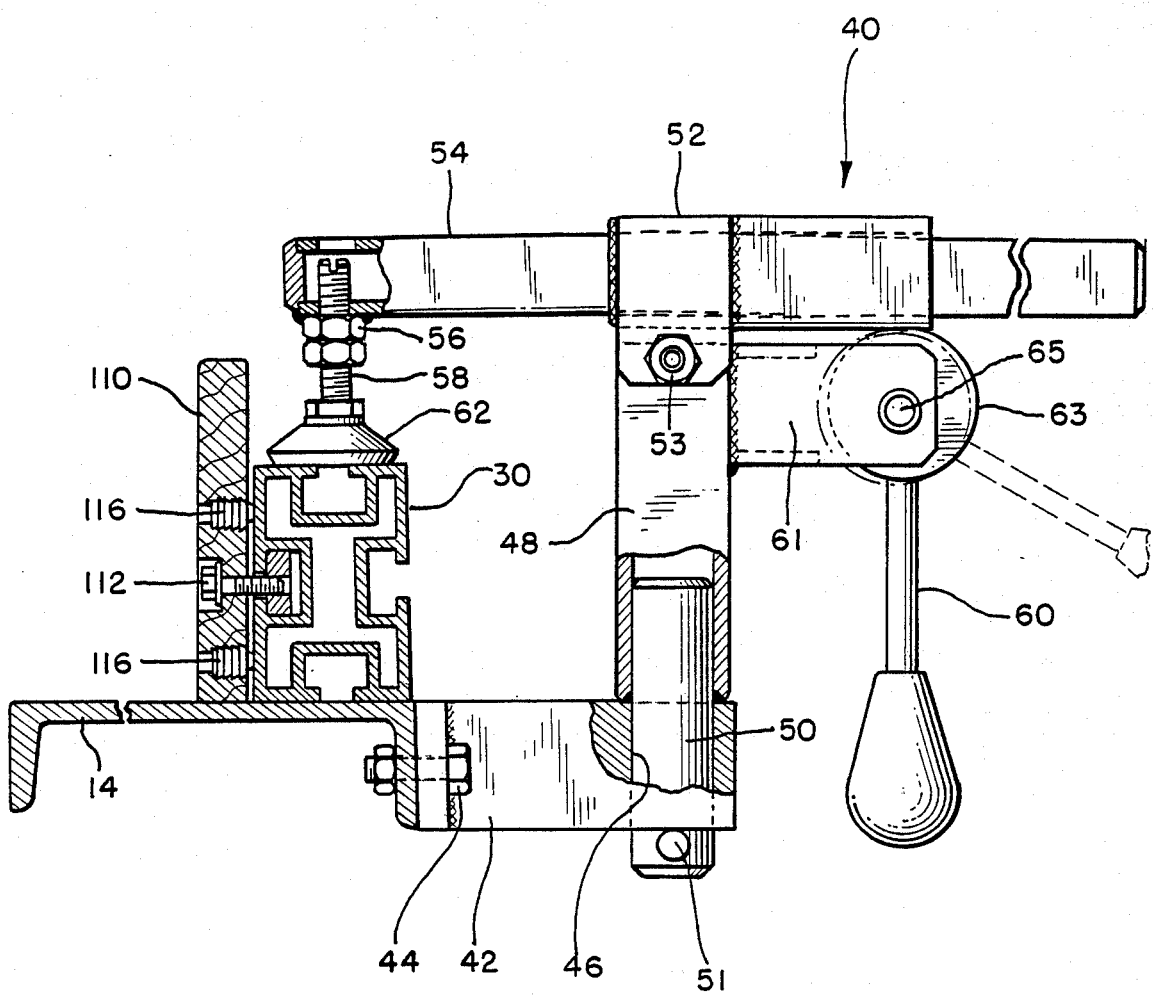
FIG. 4 is a cross sectional view taken along line 4—4 of FIG. 3.

FIG. 4 provides additional details of the clamp assembly 40, which includes a clamp bracket 42 that is rigidly secured to the machine table 14 by bolts 44. The clamp bracket 42 defines a vertically oriented bore 46 at its outer end. An upright element 48 defines a pin 50 at its lower end that pivotably fits within the bore 46 and is held in place by a cross pin 51. A horizonally oriented sleeve 52 is pivotably mounted to the upper end of the element 48 by a fastener 53. A horizontally oriented tube 54 is mounted to slide in the sleeve 52, and the tube 54 includes a through aperture and an aligned nut 56 which is welded in place on the tube 54. A threaded rod 58 supports a clamping foot 62, and the rod 58 is held in place by the nut 56. A bracket 61 supports a cam 63 on the element 48 for rotation about an axis defined by a fastener 65. A handle 60 is secured to the cam 63.

When the handle 60 is raised as shown in dotted lines, the tube 54 is free to slide in the sleeve 52 and the clamping pressure on the beam 30 is removed. When the handle 60 is lowered to the position shown in solid lines in FIG. 4, the sleeve 52 is pivoted, thereby applying clamping pressure on the beam 30 and locking the tube 54 in the sleeve 52.

The clamping assembly 40 is a low profile design. The vertical height of the clamping assembly 40 can be reduced to an even greater extent when it is used with an L-shaped beam such as the beam 30a of FIG. 12.

FIGS. 6 and 6a provide details of an alternate clamp assembly 40a. This clamp assembly 40a includes a clamp bracket 42a which is rigidly secured to the machine table by bolts 44a. The clamp bracket 42a defines a vertically oriented bore 46a at its outer end. An upright element 48a defines a pin 50a at its lower end that pivotably fits within the bore 46a, and a horizontally oriented sleeve 52a at its upper end. A horizontally oriented tube 54a is mounted to slide in the sleeve 52a, and the tube 54a includes a through aperture and an aligned nut 56a which is welded in place on the tube 54a. A threaded rod 58a is vertically oriented to pass through the tube 54a. This threaded rod 58a supports a clamping foot 62a at one end and a handle 60a at the other.

In the jointer 10 of FIG. 1 it is preferable to have two clamping assemblies 40, 40a for each of the tables 12, 14. One of the clamping assemblies 40, 40a should be positioned as near the end of the respective table 12, 14 as possible, and the other clamping assembly 40, 40a should be positioned as near to the cutterhead 16 as possible. The inner clamping assemblies 40, 40a can be pivoted as shown in FIG. 2 if necessary. The clamping assemblies 40, 40a can be adjusted to clamp the beam 30 at the desired lateral position across the width of the table 12 by properly positioning the tubes 54, 54a in the sleeves 52, 52a.

The clamping assemblies 40, 40a serve to clamp the inner ends of the beams 30 firmly against the upper surface of the machine tables. Of course, other structures than those shown in FIGS. 4, 6 and 6a can be used for this purpose. For example, a threaded shaft assembly similar to that of FIG. 6 can be substituted for the cam 63 of FIG. 4. As another example the beam 30a may be bolted to the machine table by means of bolts 40b that engage tapped holes in the machine table 12, as shown in FIG. 12. In this embodiment, the beam 30a is preferably provided with slots 32a to allow lateral adjustment of the position of the beam 30a on the table 12. In addition, other types of clamping assemblies which are secured to the machine table can be substituted for those shown. By way of example, the clamp bracket 42, 42a and the upright element 48, 48a can be welded from component parts or cast as desired.

As best shown in FIGS. 7 and 8, the ledge 70 is secured to the outer end of the beam 30. It is the ledge 70 that actually supports the workpiece and forms the extension table, and it is important that the ledge 70 be flat, dimensionally stable, warp resistant, and that it provide a relatively low friction to the sliding workpiece. In this embodiment the ledge 70 is formed of medium density fiberboard with a plastic laminate facing. By way of example, the ledge 70 can be 6 inches in width and ½ inches in thickness, though alternate applications may require ledges wider or narrower than the presently preferred width. The laminated board sold under the tradename Melamine has been found suitable. As shown in FIG. 7 the ledge 70 can be bolted to the underside of the beam 30 by bolts 72 which engage nuts 74 positioned in the lower T slot 32.

As described below, in most applications it is important that the ledge 70 provide continuous support to the workpiece. Preferably, the ledge should extend along the beam 30 for at least two thirds of the outer portion of the beam. Preferably, the ledge 70 is no less than about two feet in length. In this way any tendency of the workpiece to shift abruptly as it is moved along the ledge is minimized, along with any tendency of the workpiece to snag on the ledge 70 or to chatter against the ledge 70.

In many applications it will be important to minimize the weight of the ledge 70, and FIG. 11 shows one light weight alternative ledge 70a. This ledge 70a is a stressed skin box structure made up of edge elements 76a and face elements 77a. This box structure encloses an expanded stiffening means 78a such as a cardboard honeycomb material of the type used in hollow core doors. In this embodiment the edge elements 76a can be formed of particle board or medium density fiberboard and the face elements 77a can be formed of plastic faced hardboard. By way of example, the edge elements 76a may be ¾ inch in thickness and the plastic faced hardboard ⅛ inch in thickness. Of course, many alternative constructions can be used for the ledge 70, including hard anodized hollow aluminum extrusions, aluminum plates, plastic extrusions, plastic laminate faced plywood, and precision machine castings. In some embodiments it may be preferable to form the ledge 70 as an integral part of the beam 30.

As shown in FIGS. 2, 7 and 8, each of the extension tables 20, 22 includes a leg mounting bracket 80. As shown in FIG. 8, each leg mounting bracket 80 is made up of a plate 82 and a tube 84. A nut 86 is welded in place to the tube 84, and a threaded shaft 88 engages the nut 86. This threaded shaft 88 supports a knob 90 on its outer end. The leg mounting bracket 80 is mounted to the beam 30 by bolts 92 which engage a tapped bar 94 positioned in the respective T slot 32. Once the bolts 92 are tightened in place, the leg mounting bracket 80 is rigidly secured to the beam 30. A leg 96 is slideably positioned inside the tube 84, and the leg 96 includes a non-skid plastic or rubber foot 98 and a cap 100. Preferably, the foot 98 is sized no larger than the leg 96 such that the leg 96 can be inserted into the tube 84 from above.

In this embodiment the tube 84 is approximately 3¼ inch in length, and the leg 96 is 1¼ inch square steel tubing. The leg 96 is dimensioned to provide a close sliding fit in the tube 84. If desired, a leveling foot can be placed on the leg 96.

The purpose of the leg mounting bracket 80 and the leg 96 is to support the beam 30 against deflection under load. For this purpose a wide variety of structures can be used, including legs formed out of wood with metal wear strips positioned to engage the threaded shaft 88. Hinged clamps with telescoping legs may be used in applications where no loose parts are desired. As another alternative, conventional clamps can be used to clamp the leg 96 to a right angle flange mounted on the beam 30.

Alternately, the leg mounting bracket may be formed of a aluminum extrusion, as shown at reference numeral 80a in FIGS. 9 and 10. The leg mounting bracket 80a includes a plate 82a and a band 84a configured to encircle the leg 96a. The band 84a mounts friction pads 86a which may be formed of a suitable plastic or rubber. A bolt 88a extends between the two ends of the band and is secured by a knob 90a. The plate 82a is securely mounted to the beam 30 by bolts 92a which engage a tapped bar 94a positioned in the respective T slot 32.

The leg mounting bracket 80a and the leg 96a are formed of aluminum and are therefore particularly light in weight. Circumferential clamping over a large clamping area as provided by the leg mounting bracket 80a does not spall or deform the aluminum leg 96a.

Figure 10A:
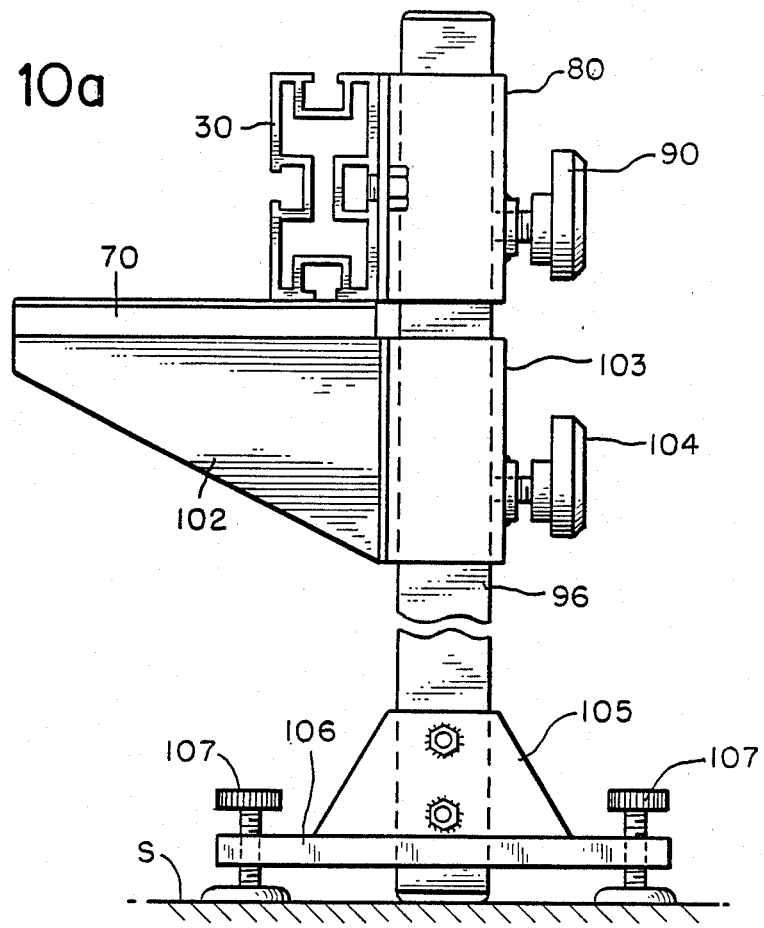
FIG. 10a is an elevational view of a first alternate leg to that shown in FIG. 7.
Figure 10B:
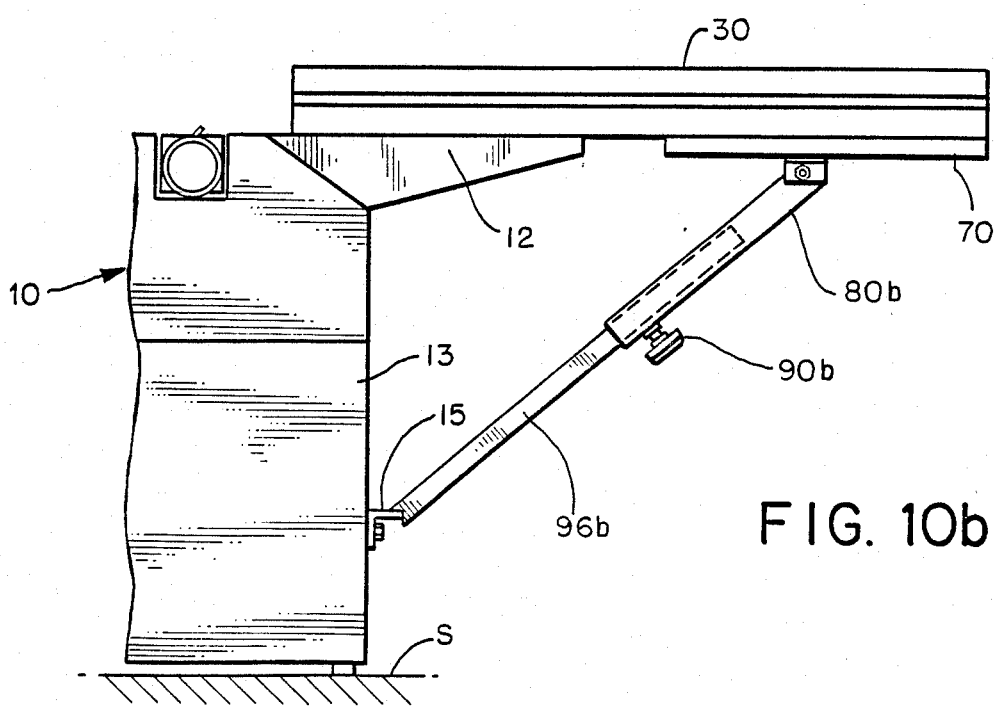
FIG. 10b is an elevational view of a second alternate leg to that shown in FIG. 7.

FIGS. 10a and 10b show two further arrangements that can be used for the support leg. The support leg 96 of the embodiment of FIG. 10a is identical to the support leg 96 described above with two exceptions. First, a ledge support bracket 102 is rigidly mounted to a channel 103 which is in turn adjustably secured to the support leg 96 by a knob 104. Once the leg 96 has been properly placed in position, the ledge support bracket 102 can be raised and clamped in place to support the ledge 70 across the full width of the ledge 70. Second, a leveling bracket 105 can be bolted to the bottom of the leg 96. This bracket 105 supports a horizontal beam 106 that in turn supports two leveling screws 107. These leveling screws 107 can be adjusted to ensure that the support leg 96 does not lean from its original position during use.

As shown in FIG. 10b it is not essential in all embodiments that the support leg rest on the same support surface S as that which supports the machine tool. In FIG. 10b the jointer 10 includes a base 13 that is supported on a support surface S such as a floor. In this embodiment a horizontal ledge 15 is secured to the base 13. This ledge 15 acts as a support surface for a support leg 96b. This leg 96b telescopes in a leg mounting bracket 80b that is in turn pivotably secured to the underside of the beam 30. A knob 90b is used to lock the support leg 96b in any selected position with respect to the bracket 80b. The support leg 96b of FIG. 10b does not provide many of the advantages of the embodiments described above, and in particular does not support the jointer 10 against tipping.

Though much preferred, the leg mounting bracket 80, 80a, 80b and the leg 96, 96a, 96b are not essential in all embodiments. For example, if the machine table is particularly robust (as for example in a heavy industrial jointer) the machine table itself may completely support the beam 30. Furthermore, in less robust machine tables there are applications where the workpiece is particularly light in cross section the leg mounting bracket 80, 80a may not be required.

Depending upon the application, the extension tables 20, 22 can often be used with the standard guide fence. As shown in FIG. 2, the infeed and outfeed extension tables 20, 22 are positioned on either side of the cutterhead 16, and conventional center mounted fences can be used without obstruction with the extension tables 20, 22.

In the event it is desired to replace the standard machine tool guide fence with a fence mounted on one of the extension tables 20, 22, a number of approaches can be used. FIGS. 4 and 5 show a fixed fence 110 which is firmly secured to the beam 30 of the outfeed extension table 22 by means of bolts 112 which engage nuts 114 captured in the respective T slot 32. Threaded inserts 116 are positioned in the fence 110, and these inserts 116 support set screws 118 that can be used to adjust the fence 110 to a position transverse to the machine table.

FIG. 13 shows a tilting fence 120 that can be mounted to the beam 30 so as to tilt to define an acute angle with the machine table. This embodiment includes a hinge made up of a fixed hinge leaf 122 secured to one of the side facing T slots 32 of the beam 30 and a movable hinge leaf 124 secured to the tilting fence 120. The movable hinge leaf 124 pivots about a hinge axis 126. A set screw 128 defines the right angle rest position of the tilting fence 120. An arcuate guide 130 which defines an arcuate slot 132 is mounted to the tilting fence 120, and a locking bracket 134 is mounted to the upper T slot 32 of the beam 30. This locking bracket 134 supports a locking fastener 136 that passes through the slot 132 and can be tightened to support the tilting fence 120 at any desired positioned along the length of the slot 132.

FIG. 14 shows another tilting fence 140 which can be tilted to an obtuse angle with the machine table. The tilting fence 140 is mounted to a movable hinge leaf 144 which hinges about a hinge axis 146 with respect to a fixed hinge leaf 142. The fixed hinge leaf 142 is secured to the upper T slot 32 of the beam 30. An arcuate guide 148 is secured to the movable hinge leaf 144, and this guide 148 defines an arcuate slot 150. A locking bracket 152 is fixedly secured to the fixed hinge leaf 142, and the locking bracket 152 supports a locking fastener 154 which passes through the slot 150. The tilting fence 140 is secured to the movable hinge leaf 144 by a fastener 158 which passes through a slot 156 in the tilting fence 140. By loosening the fasteners 154, 158, positioning the tilting fence 140 as desired, and then tightening the fasteners 154, 158, the angle of the tilting fence 140 can readily be adjusted.

Figure 15:
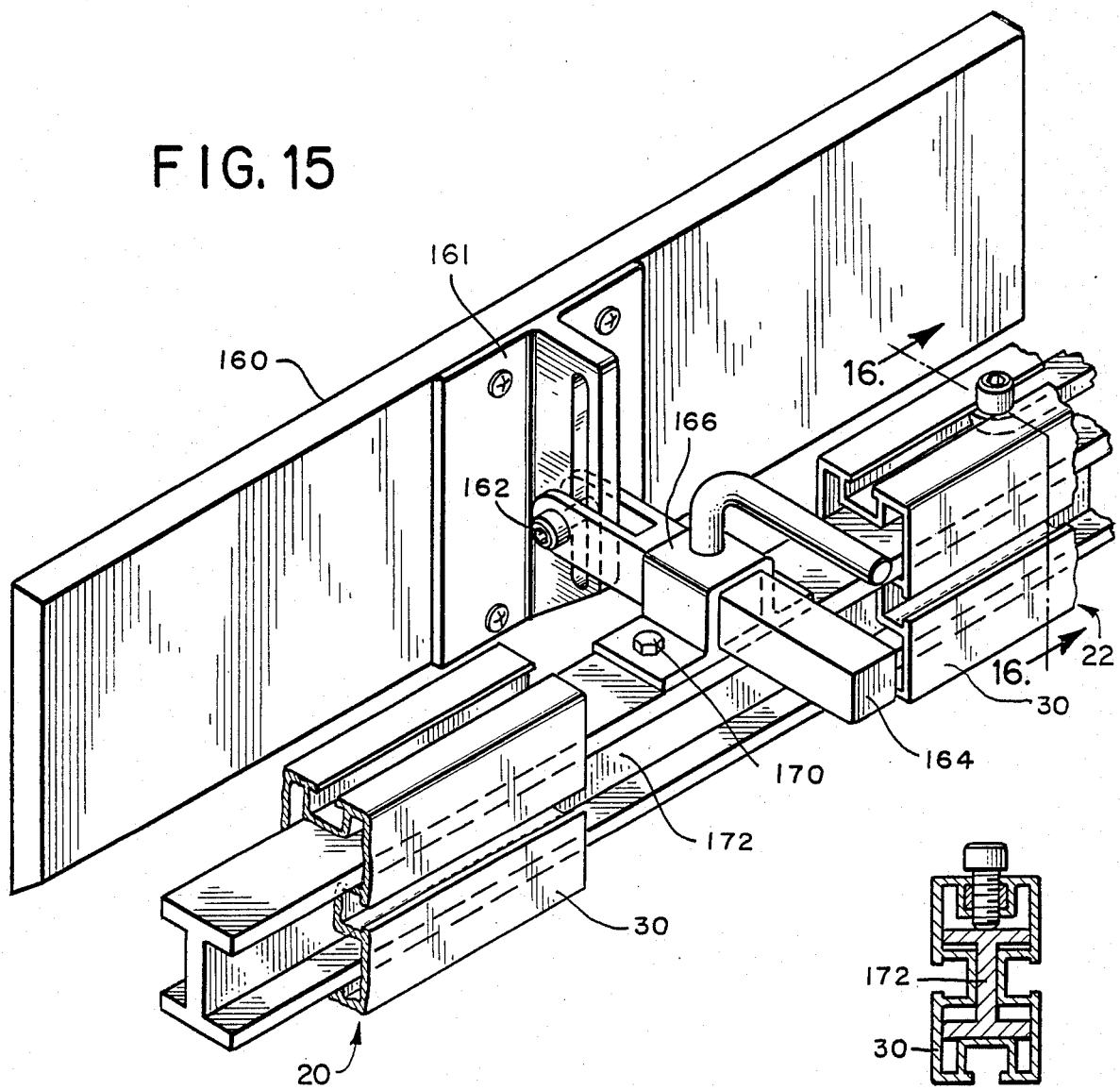
FIG. 15 is a fragmentary perspective view of a fourth fence suitable for use in the embodiment of FIG. 1.
Figure 16:
FIG. 16 is a cross sectional view taken along line 16—16 of FIG. 15.

The embodiment of FIGS. 15 and 16 allows both acute and obtuse working angles by mounting a tilting fence 160 onto an I-shaped coupler 172 which extends between the beams 30 of the infeed and outfeed extension tables 20, 22. The coupler 172 fits into axially extending cavities in the beams 30 in a close sliding fit, and is dimensioned to allow vertical movement of the beam 30 of the infeed extension table 20. The coupler 172 is clamped in place only to the beam 30 of the outfeed extension table 22 (FIG. 16), and it does not interfere with vertical movement of the infeed extension table. The tilting fence 160 is pivotally mounted by way of a slotted bracket 161 to a horizontal bar 164 by a locking fastener 162. The bar 164 is received in a sleeve 166 and can be locked in place by means of a lever 168. Fasteners 170 rigidly secure the sleeve 166 to the coupler 172. The coupler 172 provides a reduced and more centered mounting height for the tilting fence 160. In addition, the coupler 172 ensures lateral alignment of the two beams 30 and allows the two outer clamping assemblies 40 farthest from the cutterhead 16 to be eliminated.

Figure 17:
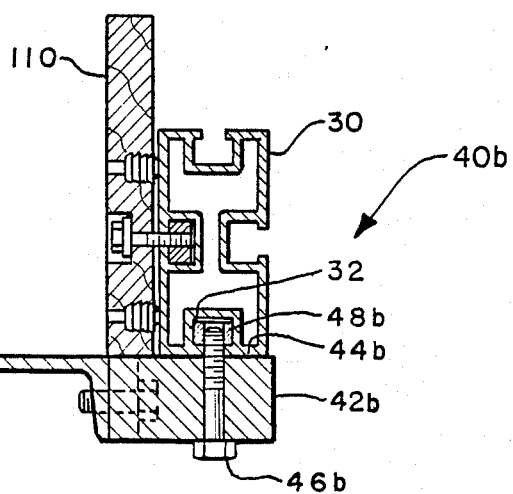
FIG. 17 is a cross sectional view of an alternative mounting arrangement for one of the extension tables of FIGS. 1-4.

There are applications (as for example a jointer having machine tables only 4 inches in width) in which it may be undesirable to use a portion of the machine table to support the beam 30. In such applications a slightly revised clamping assembly 40b may be used as shown in FIG. 17. The clamping assembly 40b includes a clamping bracket 42b which defines a planar beam support surface 44b at its upper edge. The clamping bracket 42b is rigidly secured to the machine table 14 with the beam support surface 44b at the same level as the working surface of the machine table 14. The beam 30 is then mounted directly on the beam support surface 44b by means of a fastener 46b which engages a tapped bar 48b in the lower T slot 32. In effect, the clamping bracket 42b acts as a table extension to extend the plane of the table 14 laterally. In this way the beam 30 may be supported at the plane of the table 14 without occupying any portion of the table surface itself.

OPERATION

In order to set up the embodiment shown in FIG. 1 the clamp brackets 42 of the clamping assemblies 40 are first secured to the tables 12, 14 with the bolts 44. Since the clamp brackets 42 do not extend above the level of the tables 12, 14 they do not interfere with conventional placement of fences and the like. Then the ledges 70 are mounted to the lower surfaces of the beams 30 with the bolts 72, and the leg mounting brackets 80 are secured to the beams 30 with the bolts 92. This completes preparation of the clamp brackets 42 and the beams 30.

When it is desired to mount the beams 30 on the tables 12, 14 the clamping assemblies 40 are first used to clamp the inner ends of the beams 30 directly onto the tables 12, 14 such that the outer ends of the beams 30 are cantilevered out from the tables 12, 14 and the beams 30 are parallel to the feed axis of the jointer 10. When clamped in place the lower surfaces of the beams 30 are substantially coplanar with the upper surfaces of the machine tables 12, 14 and effectively extend the planes of the tables 12, 14. When the clamping assemblies 40 are tightened, the cross pins 51 prevent the pins 50 from moving axially in the bores 46.

The legs 96 are placed in the leg mounting brackets 80 with the feet 98 resting on the floor or other support surface. The leg mounting brackets 80 are then tightened on the legs 96 to support the beams 30 against deflection when a workpiece is placed on the ledges 70.

When it is desired to move the beams 30 laterally across the tables 12, 14 the legs 96 are either removed or alternately raised above the support surface and reclamped in the leg mounting brackets 80. Then the clamp assemblies 40 are released and the tubes 54 adjusted in the sleeves 52 to position the beams 30 at the desired lateral position on the tables 12, 14. Once the clamp assemblies 40 have been retightened, the legs are reinserted or the leg mounting brackets 80 are released to allow the legs 96 again to contact the support surface before the leg mounting brackets 80 are retightened on the legs 96. When it is desired to raise or lower the infeed table 12, the threaded shaft 88 of the associated leg mounting bracket 80 is loosened, the table 12 is positioned as desired, and then the threaded shaft 88 is retightened.

It should be clear from this discussion that the leg 96 only supports the beam 30 against deflection under load, and the leg 96 does not dictate the original alignment of the beam 30 with respect to the table 12, 14. Instead, it is the beam 30 that dictates the original alignment, while the leg 96 functions solely to prevent the beam from being deflected out of the its original position under load. With this arrangement the extension tables 20, 22 actually stabilize a compact and light weight machine tool.

The extension tables 20, 22 are easy to install and light in weight. They can be used to increase the effective length of a machine table by a factor of three or more in a low cost, portable manner. Because the ledges 70 provide continuous support for the workpiece, snagging of a flexible workpiece is eliminated. Because the beam 30 is clamped directly onto the planar machine table, the beam 30 can be used with any machine tool having a planar machine table, and is not limited to use with jointers as described above.

ALTERNATE APPLICATIONS FOR SUPPORT OF LONGITUDINALLY FED WORKPIECES

Figure 18:
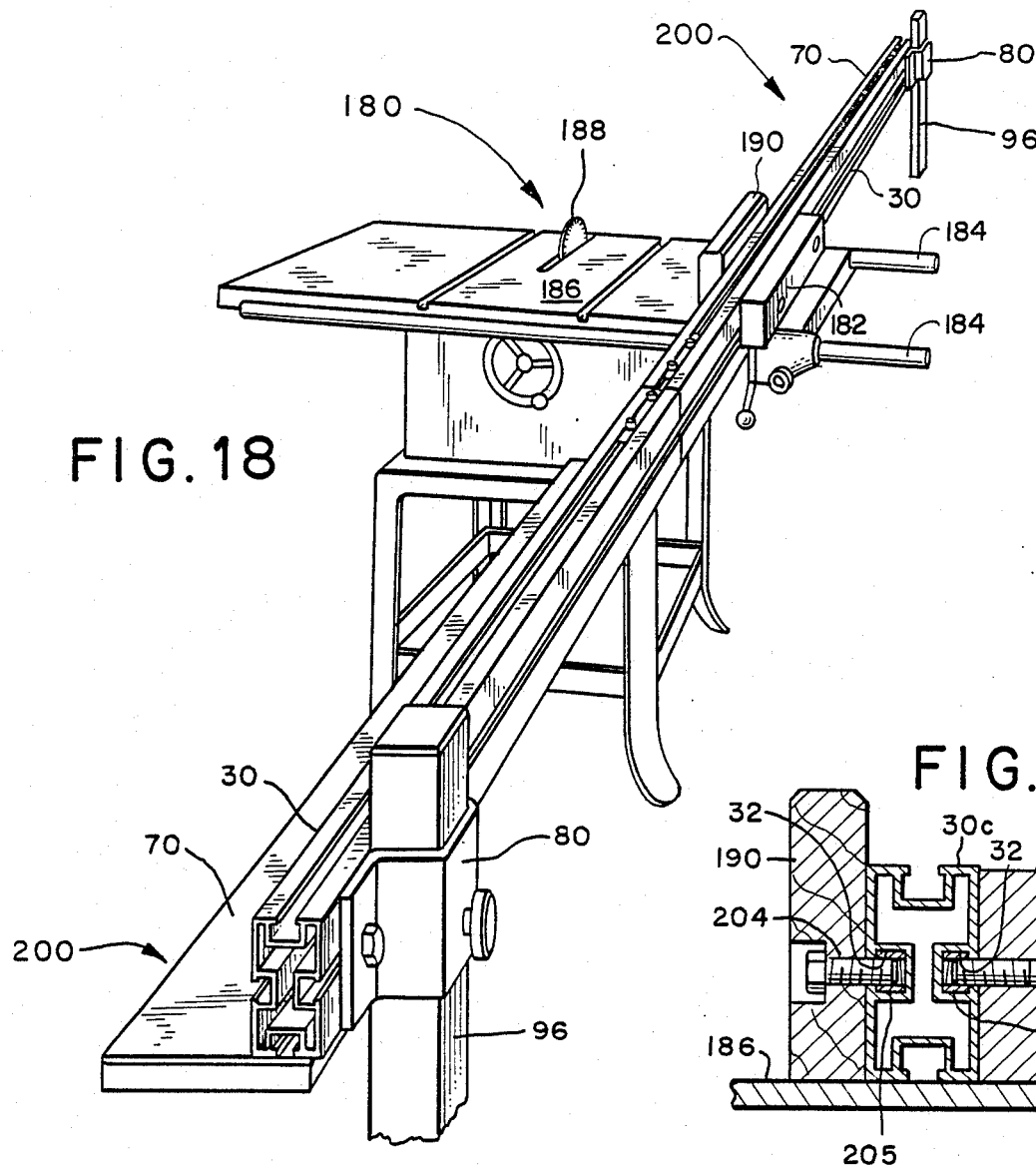
FIG. 18 is a perspective view of a preferred embodiment of the extension table of this invention mounted on a table saw.

The extension table of this invention is not limited to use with jointers, but can rather be used with a wide variety of machine tools in which the workpiece is longitudinally moved along the extension table. FIG. 18 shows an extension table 200 of this invention mounted to provide continuous support for a longitudinally fed workpiece, in this case in conjunction with a table saw 180. The table saw 180 includes a conventional longitudinal guide fence 182 which slides along guide bars 184 above a machine table 186. A rotary saw blade 188 protrudes above the machine table 186 in the conventional manner.

Figure 19:
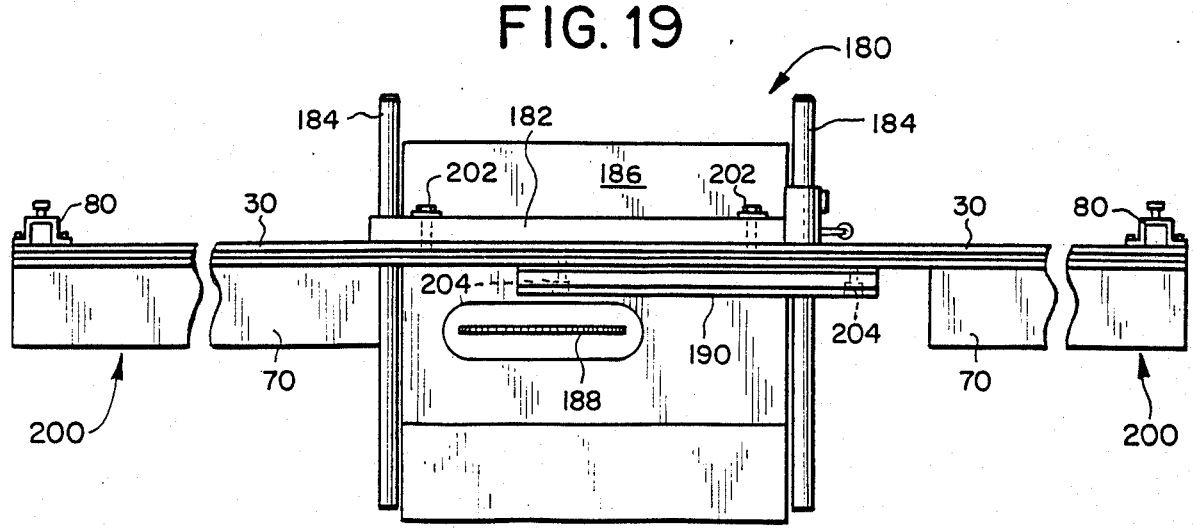
FIG. 19 is a top plan view of the embodiment of FIG. 18.

As shown in FIGS. 18 and 19, the extension table 200 can utilize the same beam 30, ledge 70, and leg mounting bracket 80 as those described above in connection with the jointer 10. However, in the embodiment of FIGS. 18 and 19 the beam 30 extends as a one piece unit from both sides of the machine table 186, and the beam 30 is mounted at its central portion to the fence 182 by means of fasteners 202. An auxiliary fence 190 is secured to the side of the beam 30 facing the saw blade 188 by means of fasteners 204. The fasteners 202, 204 cooperate with the respective T slots in the beam 30. This arrangement is statically balanced, because the beam 30 extends symmetrically from both sides of table 186. In this way continuous extension tables are provided for the workpiece both as it is fed into and as it travels away from the saw blade 188. The fence 182 and the weight of the beam 30 hold the beam 30 securely against the machine table 186, thereby ensuring that the upper surfaces of the ledges 70 are coplanar with the machine table 186.

One particular advantage of such continuous, coplanar support is the accuracy which is obtained in molding and grooving operations, where even minor or momentary loss of contact between the workpiece and the machine reference table will cause vertical misorientation of the workpiece and unacceptable chatter due to inconsistent depth of cut. Similarly, problems of inaccuracy are avoided where bevel cuts to width are guided by the auxiliary fence 190.

Figure 20:
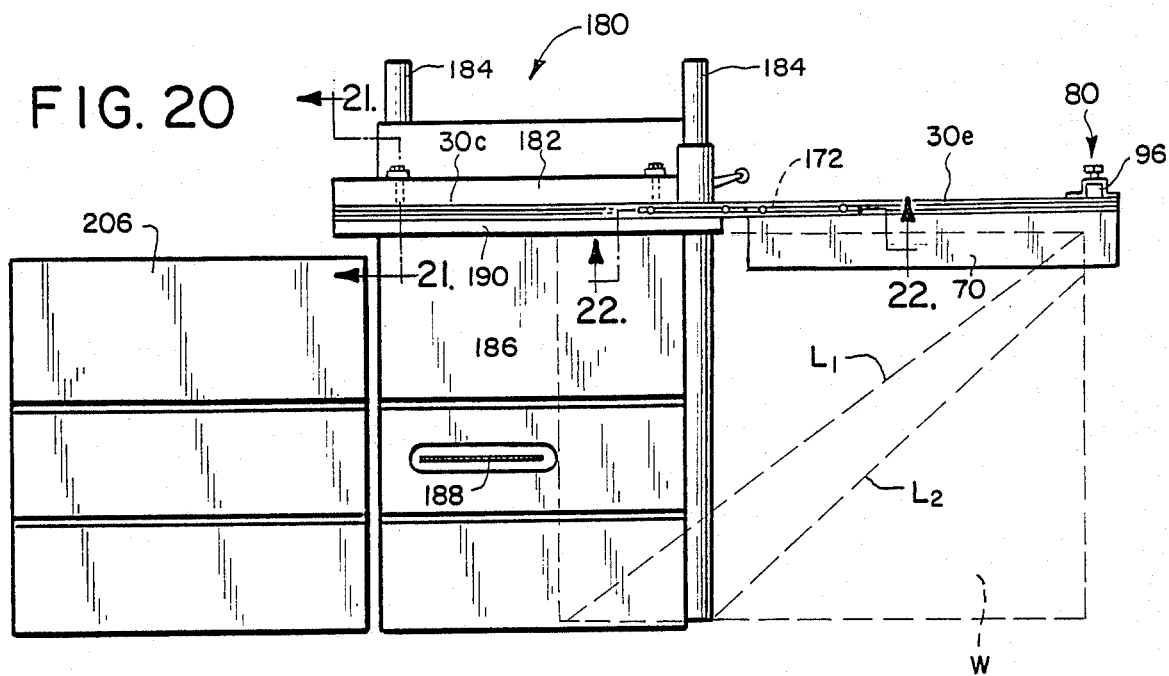
FIG. 20 is a top plan view of a modified form of the embodiment of FIGS. 18 and 19 which utilizes a conventional outfeed table.

FIG. 20 shows a modified extension table used with the table saw 180. Before proceeding to a detailed description of this modified extension table, FIG. 20 will be used to clarify how a large panel workpiece W is continuously supported, in this case during a longitudinal parting cut. The forward edge of the workpiece W is supported initially across much or all of its width by the machine table 186. The edge of the workpiece W adjacent the auxiliary fence 190 at the infeed side is supported in part by the machine table 186 and in part by the ledge 70. The dashed line L1 extends between two opposed corners of the workpiece W, and the dashed line L2 extends between the continuously changing extremes of support of the workpiece W. The center of gravity of the workpiece W is positioned along the line L1, and the workpiece W is therefore continuously stable, even though it is supported on the infeed side of the cut along only two edges. Since the workpiece W is in two separate pieces at the outfeed side, the foregoing approach will not provide adequate support to both pieces of the workpiece W. For this reason, a conventional support table 206 is used at the outfeed side of the embodiment of FIG. 20.

Figure 21:
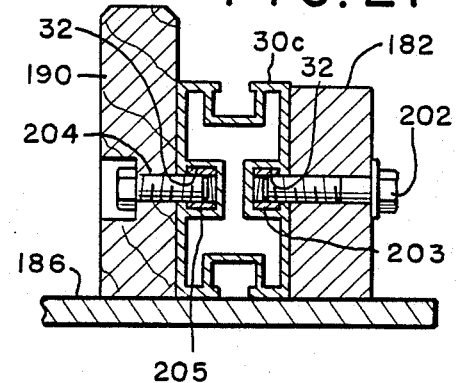
FIG. 21 is a cross sectional view taken along line 21—21 of FIG. 20.

In the embodiment of FIG. 20 the beam 30 is formed in two separate parts a central beam 30c which is secured to the fence 182, and an end beam 30e which is secured to the central beam 30c. FIG. 21 provides details for the mounting of the central beam 30c. The central beam 30c is secured to the basic machine fence 182 by fasteners 202 which engage nuts 203 in the corresponding T slot 32. The auxiliary fence 190 is in turn securely mounted to the beam 30c by fasteners 204 which engage nuts 205 in the respective T slot 32. In this way the beam 30c is sandwiched between the basic machine fence 182 and the auxiliary fence 190, with the lower surface of the beam 30 resting on the machine table 186.

Figure 22:
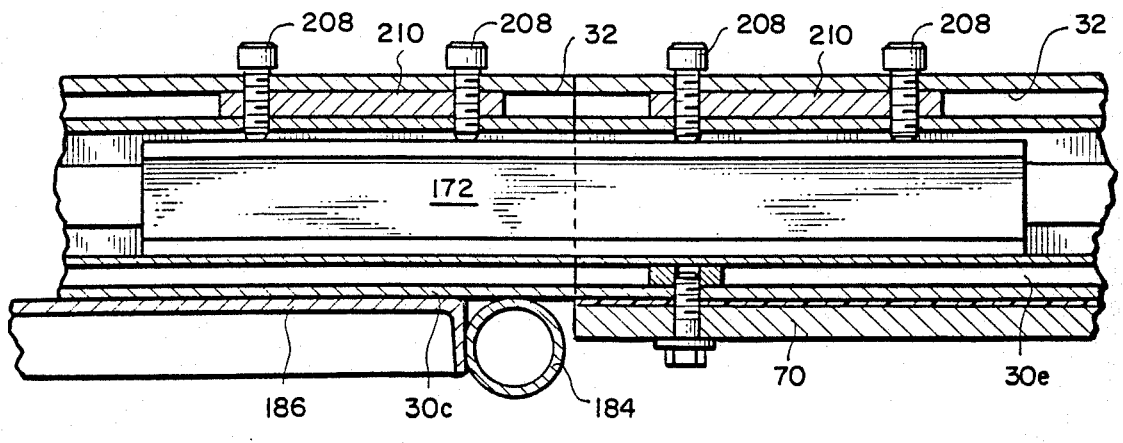
FIG. 22 is a cross sectional view taken along line 22—22 of FIG. 20.

FIG. 22 provides details as to the manner in which the end beam 30e is mounted to the center beam 30c in the embodiment of FIG. 20. As shown in FIG. 22, a rigid coupler 172 which is I-shaped in cross section as described above extends into axial openings formed in the two beams 30c, 30e. The coupler 172 is clamped in place to the center beam 30c by cap screws 208 which engage a tapped bar 210 positioned in the upper T slot 32. The end beam 30e is in turn rigidly clamped to the coupler 172 by similar cap screws 208 and bar 210.

In many applications it will be convenient to leave the center beam 30c and the auxiliary fence 190 permanently mounted to the basic machine fence 182. Then when it is desired to use the extension table, the end beam 30e and the coupler 172 can simply be secured to the center beam 30c by the cap screws 208. The coupler 172 ensures that the lower surface of the end beam 30e is coplanar with the lower surface of the center beam 30c, and therefore with the machine table 186. In this way, the upper surface of the ledge 70 is maintained coplanar with the machine table 186.

Another advantage of the mounting of FIGS. 18 and 19 is that the auxiliary fence 190 can be locked in any one of a number of axial positions with respect to the saw blade 188. For example, when large panels are being cut the auxiliary fence 190 can be centered on the table 186. When solid wood is being ripped the auxiliary fence 190 can be positioned as shown in FIG. 19 so as not to extend substantially past the center line of the saw blade 188. Finally, the auxiliary fence 190 can be moved entirely in front of the saw blade 188 to provide a stop for cutoff of a workpiece guided with a miter guide (not shown).

Of course couplers 172 can be provided to mount extension tables at both the infeed and the outfeed ends of the center beam 30c. In fact, the same beams 30 that are used with the jointer 10 as described above can be removed from the jointer 10 and mounted with the couplers 172 to the center beam 30c to complete installation of the extension tables on the table saw 180. One particular advantage of this arrangement is the economy that comes from using the same extension tables with multiple machine tools.

Figure 20A:
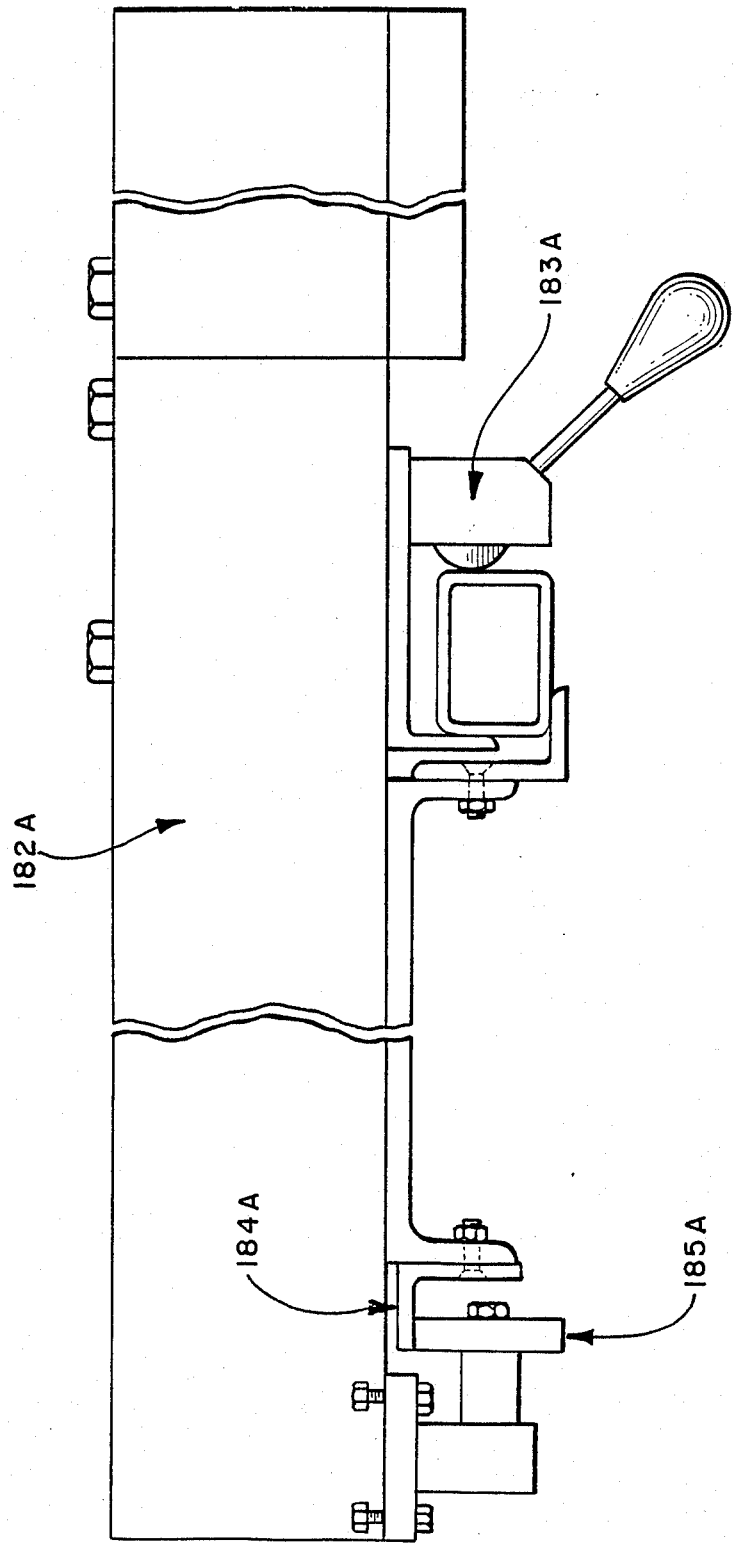
FIG. 20a is an elevational view of a restraining means for the fence shown in FIG. 20.

Another advantage of the embodiment of FIG. 20 is that the extension table automatically moves laterally across the machine table 186 with the fence 182. In this way the extension table is always positioned in alignment with the fence as desired, and it does not obstruct the movements of the operator during sawing operations. When the basic machine fence 182 is used to mount the beam 30, it is preferable that each end of the fence 182 be restrained against vertical motion in order to eliminate any tendency of the beam 30 to tilt in use. Many conventional machine fences are designed to achieve proper alignment with regard to the longitudinal axis of the machine table by clamping to a single guide tube located at the infeed end of the table. Typically, the outfeed end of such fences should remain unrestrained in order to avoid interference with proper alignment to the reference guide tube. For this reason, some suitable supplemental means should preferably be provided to resist vertical movement of the distal end of the fence while still allowing free horizontal movement. FIG. 20a shows one approach that can be used to restrain the outfeed end of a fence 182a which is locked in place by a conventional locking assembly 183a. A restraint rail 184'a is secured to the outfeed edge of the table, and the outfeed end of the fence 182a supports a roller 185a. This roller 185a bears on the underside of the rail 184a to prevent the fence 182a from lifting vertically. The roller 185a does not interfere with horizontal movement or alignment of the fence 182a.

Of course, the coupler 172 should be sufficiently long to provide a rigid connection between the two beams 30c, 30e without deforming the beams 30c. In this embodiment the coupler 172 is 24 inches in length. Preferably, the coupler 172 is formed of an aluminum extrusion, and the top and bottom surfaces may be faced with a material such as a stainless steel plate to increase surface hardness. The coupler 172 should be used in conjunction with a leg mounting bracket 80 and a leg 96 to avoid overstressing the coupler 172 or the beams 30c, 30e adjacent to the coupler 172.

Figure 23:
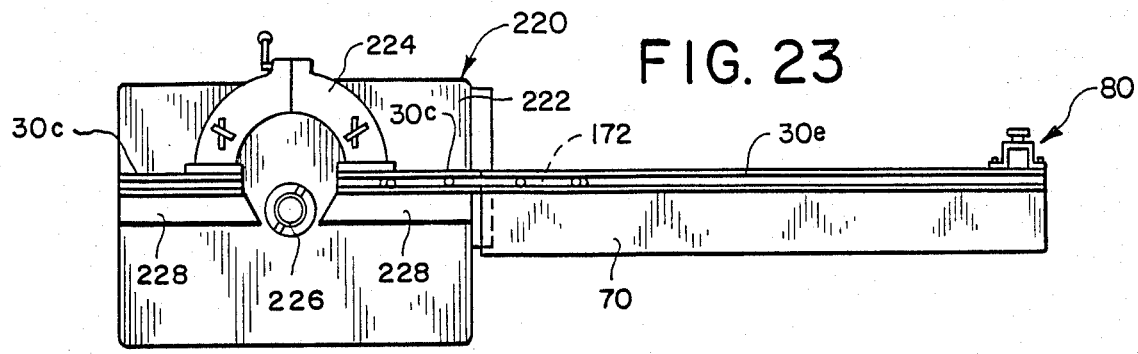
FIG. 23 is a top plan view of a preferred embodiment of the extension table of this invention mounted on a shaper.
Figure 24:
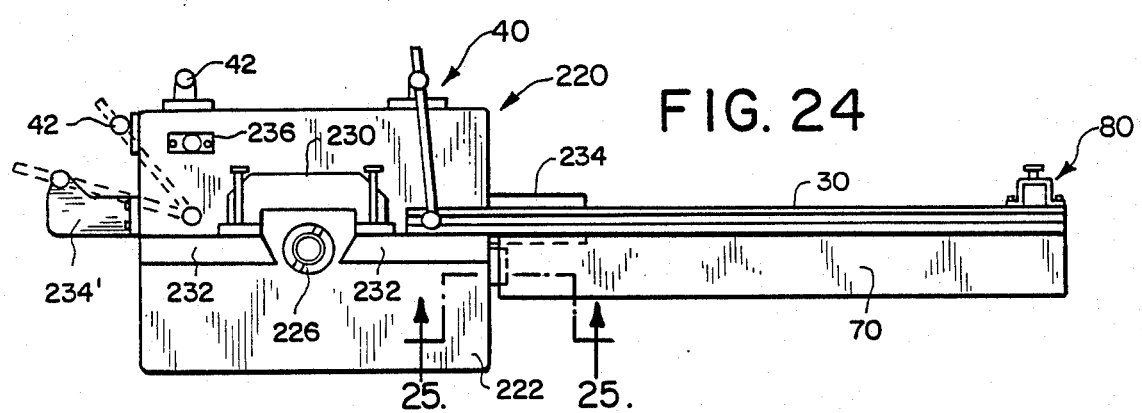
FIG. 24 is a top plan view of another preferred embodiment of the extension table of this invention mounted on a shaper.

The techniques described above can be used to provide extension tables for other longitudinal feed machine tools as well. FIGS. 23 and 24 show embodiments of the extension table of this invention mounted to a shaper 220. FIG. 23 is a top plan view of the shaper 220 which includes a machine table 222 and a yoke shaped split fence 224 which is clamped in place on the table 222. A vertical spindle 226 protrudes through the table 222 and is used to mount a shaper cutter. These features of the shaper 222 are conventional and form no part of this invention.

According to this invention, a center beam 30c is mounted to each side of the split fence 224. The center beams 30c may be identical to the center beam 30c described above except as to length. Auxiliary fences 228 are then mounted to the center beams 30c so as to provide longitudinally adjustable guidance and support to the workpiece past the cutter. Alternatively, an appropriate cavity for the coupler can be incorporated into the basic split fence itself. The center beams 30c are held against the upper surface of the machine table 222 by the split fence 224. An end beam 30e is rigidly mounted to the center beam 30c by means of a coupler 172 in the same manner as that described above. The end beam 30e supports a continuous ledge 70 which has an upper surface that is coplanar with the machine table 222. As explained previously, a leg mounting bracket 80 is positioned at the outermost end of the end beam 30e to prevent deflection of the end beam 30e under load.

In the embodiment of FIG. 23, the center beam 30c is sandwiched between the split fence 224 and the auxiliary fence 228. In contrast. FIG. 24 shows a top view of a shaper 220 which utilizes an unmodified split fence 232. In the embodiment of FIG. 24 a one piece beam 30 is clamped directly to the machine table 222 by a clamping assembly 40, which may be substantially identical to that described above in conjunction with the jointer application. As shown in FIG. 24, the machine table 222 overlaps the beam 30 by a relatively small amount. In order to ensure that the lower surface of the beam 30 is coplanar with the machine table 222, the table 222 is extended along the length of the beam 30 by a table extension 234. This table extension 234 is bolted to the edge of the machine table 222 and defines a beam support surface oriented coplanar with the machine table 222 and in contact with the underside of the beam 30. In addition, the beam 30 may be clamped to the table extension 234 to prevent undesired pivoting of the beam 30.

The left hand side of FIG. 24 shows several alternative clamping arrangements that can be used to hold the beam 30 on the machine table 222. A clamping bracket 42 similar to that described above may be positioned on the back or side of the machine table 222. Alternately, the clamping bracket may be integrated with a table extension 234'. With some tables it may be preferable to mount the clamping assembly closer to the beam 30 than possible if the edge of the table 222 is used to mount the clamp. In these applications a bore defining element 236 may be recessed into or surface applied to the table top 220 to receive the shank of a clamping assembly such as shown in FIG. 4 or FIG. 6A. The extension tables shown in FIGS. 23 and 24 are self aligning in the manner described above.

Figure 25:
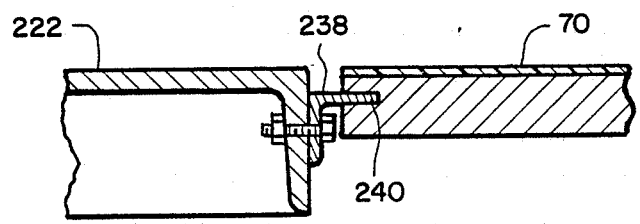
FIG. 25 is a sectional view taken along line 25—25 of FIG. 24.

FIG. 25 is a cross sectional view of the embodiment of FIG. 24 and shows one approach to reenforcing the ledge 70. As shown in FIG. 25, a right angle support bracket 238 is secured to the edge of the table 222 and is positioned to engage a correspondingly positioned slot 240 in the edge of the ledge 70 that faces the table 222. The mechanical engagement between the support bracket 238 and the slot 240 supports the ledge 70 against twist.

ALTERNATE APPLICATIONS FOR SUPPORT OF STATIONARY WORKPIECES

FIGS. 26–32 illustrate the use of embodiments of the extension table of this invention in applications where the workpiece remains stationary during the machining process.

Figure 27:
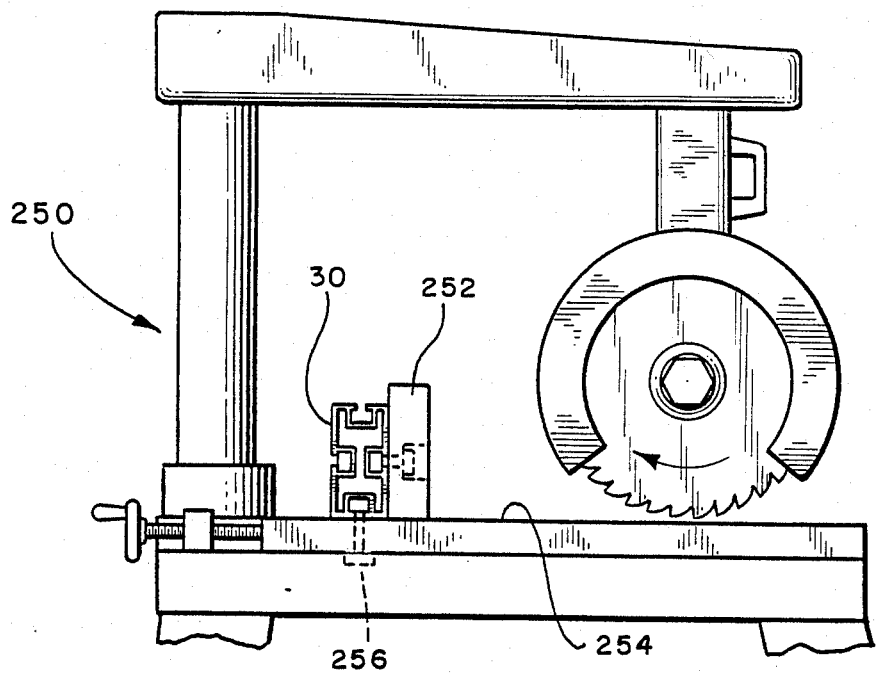
FIG. 27 is a schematic sectional view of another preferred embodiment of the extension table of this invention mounted on a radial arm saw.

FIGS. 26 and 27 show two embodiments of the extension table of this invention adapted for use with a radial arm saw 250. In the top plan view of FIG. 26 a center beam 30c is clamped in place to the machine table 254 by clamp assemblies 40. At each end of the center beam 30c two separate end beams 30e are secured together end to end by respective couplers 172 to form an extremely long extension table. Each of the end beams 30e is provided with its own leg mounting bracket 80.

In applications such as FIG. 26 it is quite important that the leg mounting bracket 80 provide sufficient support to maintain the ledges 70 coplanar with the machine table 254. The leg improvements described above in conjunction with FIG. 10a provide particular advantages in applications such as this by reducing any tendency of the beams 30e to twist under load and by fixing the legs in a vertical position.

FIG. 27 shows another arrangement for mounting a beam 30 to a radial arm saw 250. In this arrangement bolts 256 are used to hold the beam 30 directly onto the machine table 254, and the beam 30 supports a laterally adjustable pair of auxiliary fences 252, which may conveniently be repositioned as required to accommodate changing blade position according to the selected angle of cut. If desired, a measuring scale or tape may be mounted or formed on the beam 30 to provide a convenient means for gauging the length of the workpiece.

FIGS. 28 and 29 show how the extension table of this invention can readily be adapted for use with a cutoff saw 260 such as a miter saw. Conventional miter saws include a machine table 262 and a revolving circular saw platen 264 to which is mounted a circular saw 266 by way of a pivoting arm. In this embodiment a shaper-like yoke casting 268 is mounted on the machine table 262, and this yoke casting 268 supports and rigidly interconnects two center beams 30c directly on the machine table 262. If desired, a respective auxiliary fence can be fixed to each of the center beams 30c. Each of the center beams 30c supports a respective end beam 30e by a respective coupler 172 as described above. The end beams 30e mount ledges 70 and leg mounting brackets 80 as described above. FIG. 29 shows a perspective view of the yoke 268 with the two center beams 30c attached. Alternatively, an appropriate cavity for the coupler can be incorporated into basic yoke casting itself.

Preferably, the ledges 70 are continuous over a substantial length, as described above in connection with jointer applications. The need for continuous support is somewhat different for stationary workpieces than for the longitudinally fed workpieces described above. Nevertheless, important advantages of safety, speed, and convenience of operation are obtained by providing continuous support for stationary workpieces. Such continuous support eliminates the need for repeated relocation of localized support means such as individual roller stands or extremely short tabs employed in certain prior art devices described above.

FURTHER REPRESENTATIVE APPLICATIONS

Figure 30:
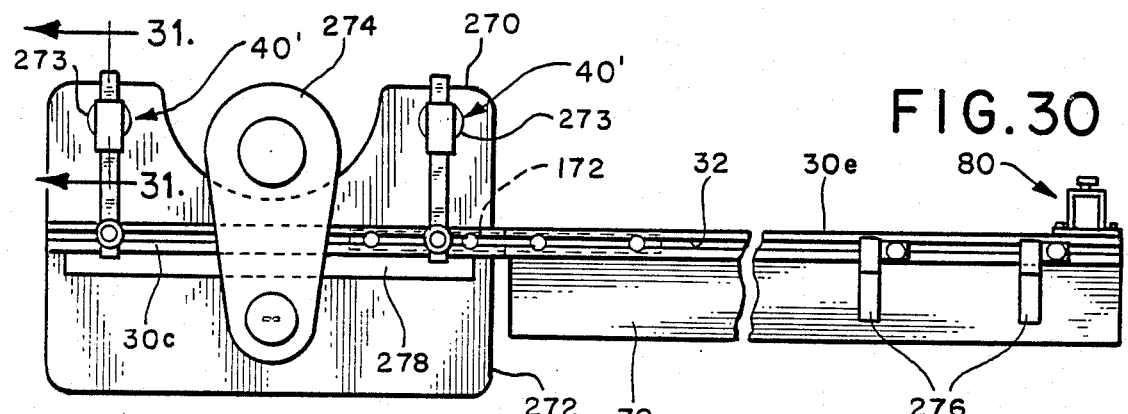
FIG. 30 is a top plan view of a preferred embodiment of the extension table of this invention mounted on a machine tool.
Figure 32:
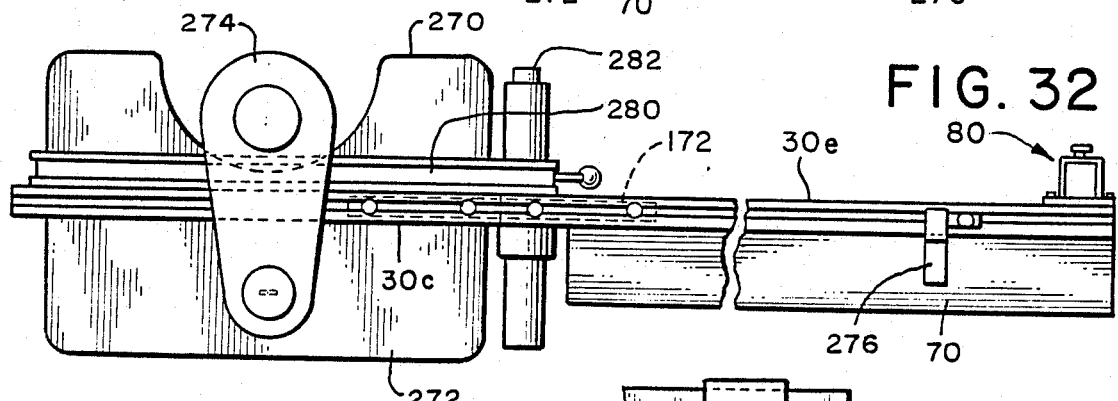
FIG. 32 is a top plan view of another preferred embodiment of the extension table of this invention mounted on a machine tool.
Figure 31:
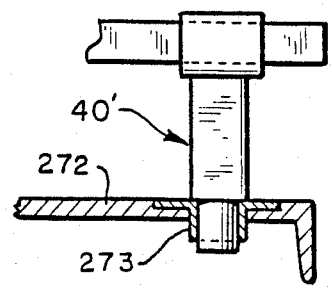
FIG. 31 is a cross sectional view taken along line 31—31 of FIG. 30.

FIGS. 30–32 show embodiments of this invention mounted in place to a machine tool 270 having a table 272 and a tool support 274. This tool support 274 is shown schematically in plan view in FIGS. 30 and 32, and can represent a band saw, a band resaw, a pin router, or a drill press for example. As shown in FIG. 30 a center beam 30c is clamped in place to the machine table 272 by clamp assemblies 40' which are mounted in bore defining elements 273 mounted in the machine table 272 (FIG. 31). The center beam 30c is connected to an end beam 30e via a coupler 172, and the end beam 30e supports a ledge 70 coplanar with the machine table 272. A leg mounting bracket 80 is mounted to the free end of the end beam 30e. Adjustable stops 276 designed to flip in and out of the workpiece support area are mounted in the uppermost T slot 32 of the end beam 30e. An auxiliary fence 278 is mounted to the face of the center beam 30c in the manner described above.

The machine tool 270 of FIG. 32 includes a basic machine fence 280 which is mounted to move along a guide bar 282. In this embodiment the center beam 30c is mounted directly to the basic machine fence 280. The basic fence 280 ensures that the center beam 30c rests on the machine table 272. In the manner described above the center beam 30c supports an end beam 30e which in turn supports a continuous ledge 70. The remaining components of FIG. 32 are identical to those described above in conjunction with FIG. 30.

Of course, it should be understood that a wide range of changes and modifications can be made to the preferred embodiments described above. For example, spacers of equal thickness can be placed between the beam and the machine table and between the beam and the ledge. With this arrangement the ledge is still coplanar with the machine table, even though the ledge and the machine table are no longer coplanar with the lower surface of the beam. In effect, the lower surfaces of the spacers define the beam plane. It is therefore intended that the foregoing detailed description be regarded as illustrative rather than limiting, and that it be understood that it is the following claims, including all equivalents, which are intended to define the scope of this invention.

I claim:

1. An extension table for a machine tool of the type that comprises a machine table that is substantially fixed during processing of a workpiece, said machine table having an upper surface that defines a reference plane, said extension table comprising:

a beam having a lower surface which defines a beam plane, said beam comprising an inner portion and an outer portion;

a ledge mounted to the lower surface of the outer portion of the beam to extend outwardly from at least one side of the beam, said ledge defining an upper surface substantially parallel with the beam plane;

means for mounting the inner portion of the beam on the machine table with the lower surface resting on the machine table and the beam plane substantially parallel with the reference plane;

said inner portion of the beam overlapping the machine table, said outer portion of the beam cantilevered from the machine table, and said beam having sufficient rigidity to ensure that when the beam is loaded only with the ledge the upper surface of the ledge is substantially coplanar with the reference plane;

a leg; and means for adjustably securing the leg to the outer portion of the beam to support the beam against downward deflection when loaded with a workpiece.

2. An extension table for a machine tool of the type that comprises a machine table that is substantially fixed during processing of a workpiece and that defines a reference plane, said extension table comprising:

a beam having a lower surface which defines a beam plane, said beam comprising an inner portion and an outer portion;

a ledge mounted to the lower surface of the outer portion of the beam to extend outwardly from at least one side of the beam, said ledge defining an upper surface substantially parallel with the beam plane;

means for mounting the inner portion of the beam on the machine table with the beam positioned above the reference plane such that the outer portion of the beam is cantilevered from the machine table with the beam plane substantially parallel with the reference plane;

said beam having sufficient rigidity to ensure that the upper surface of the ledge is maintained substantially coplanar with the reference plane when the beam is loaded only with the ledge;

a leg; and means for adjustably securing the leg to the outer portion of the beam to support the beam against downward deflection when loaded with a workpiece.

3. A pair of extension tables for a jointer of the type having an infeed table that defies an infeed reference plane and an outfeed table that defines an outfeed reference plane, said pair of extension tables comprising:

an infeed beam and an outfeed beam, each having a respective lower surface which defines a respective beam plane, each beam comprising a respective inner portion and a respective outer portion;

an infeed ledge and an outfeed ledge, each mounted to the lower surface of the outer portion of the respective beam to extend outwardly from at least one side of the respective beam, each ledge defining an upper surface substantially parallel with the respective beam plane;

means for mounting the inner portion of the infeed beam on the infeed table with the infeed beam positioned above the infeed reference plane such that the outer portion of the infeed beam is cantilevered from the infeed table with the infeed beam plane substantially parallel with the infeed reference plane;

means for mounting the inner portion of the outfeed beam on the outfeed table with the outfeed beam positioned above the outfeed reference plane such that the outer portion of the outfeed beam is cantilevered from the outfeed table with the outfeed beam plane substantially parallel with the outfeed reference plane;

said beams having sufficient rigidity to ensure that the upper surfaces of the infeed and outfeed ledges are substantially coplanar with the infeed and outfeed reference planes, respectively, when the beams are loaded only with the ledges;

a pair of legs; and means for adjustably securing a respective one of the legs to the outer portion of each of the beams to support the beams against downward deflection when loaded with a workpiece as the workpiece is moved from the infeed ledge to the infeed table and from the outfeed table to the outfeed ledge.

4. An extension table for a machine tool of the type having a machine table that is substantially fixed during processing of a workpiece and that defines a reference plane, said extension table comprising:

a center beam and at least one end beam, each having a respective lower surface which defines a respective beam plane;

at least one ledge each mounted to the lower surface of a respective one of the end beams to extend outwardly from at least one side of the end beam, each ledge defining an upper surface substantially parallel with the respective beam plane;

means for mounting the center beam on the machine table with the lower surface of the center beam resting on the machine table and the beam plane of the center beam substantially parallel with the reference plane; and means for releasably coupling each of the end beams to a respective end of the center beam such that each of the end beams is cantilevered from the center beam with the beam planes of each of the beams substantially parallel;

said beams and said beam coupling means having sufficient rigidity to ensure that the upper surface of each of the ledges is maintained substantially coplanar with the reference plane when each of the end beams is loaded only with the respective ledge;

at least one leg; and means for adjustably securing each of the legs to a respective end beam to support the end beam against downward deflection when loaded with a workpiece.

5. The invention of claim 1 or 2 wherein the beam mounting means comprises means for clamping the inner portion of the beam firmly against the machine table at a freely selectable position across a substantial portion of the width of the machine table.

6. The invention of claim 5 wherein the clamping means comprises at least two clamps spaced along the length of the beam, each coupled to the machine table to clamp the inner portion of the beam to the machine table.

7. The invention of claim 5 wherein the clamping means comprises:

a mounting bracket secured to the machine table;

an upright element mounted to the mounting bracket;

a clamping element;

means for slidingly coupling the clamping element to the upright element to permit adjustment of the horizontal position of the clamping element with respect to the upright element; and means for applying a clamping force to the clamping element.

8. The invention of claim 7 wherein the upright element is mounted to the mounting bracket by means for accommodating pivotal movement between the upright element and the mounting bracket.

9. The invention of claim 7 wherein the slidingly coupling means comprises a sleeve pivotably mounted to the upright element to receive the clamping element, and wherein the clamping force applying means is positioned beneath the clamping element to pivot the sleeve with respect to the upright element.

10. The invention of claim 3 wherein each of the beam mounting means comprises means for clamping the inner portion of each of the beams firmly against the respective table such that each of the beams overlaps the respective table by a sufficient length to support the cantilevered outer portion of the beam.

11. The invention of claim 4 wherein the center beam mounting means comprises means for clamping the center beam firmly against the machine table.

12. The invention of claim 1 wherein the inner portion of the beam overlaps the machine table by at least one quarter the length of the beam to ensure that the beam plane is parallel with the reference plane.

13. The invention of claim 1 wherein the machine tool comprises a fence and means for mounting the fence in position on the machine table, and wherein the beam mounting means comprises means for mounting the inner portion of the beam to the fence.

14. The invention of claim 4 wherein the machine tool comprises a fence, and wherein the center beam mounting means comprises means for securing the center beam to the fence such that the center beam moves across the machine table with the fence.

15. The invention of claim 1 wherein the inner and outer beam portions are formed as separate beam sections, each having a respective lower surface, and wherein the beam further comprises means for removably coupling the inner and outer beam sections together with the lower surfaces of the beam sections parallel with one another.

16. The invention of claim 15 wherein each of the beam sections defines an axial opening therein, and wherein the coupling means comprises:
a rigid coupling element dimensioned to fit within the openings to extend between the beam sections; and
means for releasably securing each of the beam sections to the coupling element.

17. The invention of claim 4 wherein each of the beams defines a respective axially oriented opening and wherein the beam coupling means comprises:
a rigid coupling element shaped to fit into the cavities to extend between the center beam and a respective end beam; and
means for releasably clamping the coupling element to the center beam and to the respective end beam.

18. The invention of claim 16 or 17 wherein the coupling element is I-shaped in cross section.

19. The invention of claim 1 or 2 wherein the beam is rectangular in cross section and defines four axially extending T slots, each on a respective face of the beam.

20. The invention of claim 3 or 4 wherein each of the beams is rectangular in cross section and defines four axially extending T slots, each on a respective face of the beam.

21. The invention of claim 1 or 2 further comprising:
a fence; and
means for mounting the fence to the beam.

22. The invention of claim 21 wherein the fence mounting means comprises means for holding the fence at an adjustable obtuse angle with respect to the machine table.

23. The invention of claim 21 wherein the fence mounting means comprises means for holding the fence at an adjustable acute angle with respect to the machine table.

24. The invention of claim 3 further comprising:
a fence; and
means for mounting the fence to one of the beams.

25. The invention of claim 1 or 2 wherein the ledge comprises a stressed wall box structure and an expanded stiffening means disposed within the box structure.

26. The invention of claim 25 wherein the stiffening means comprises a honeycomb material.

27. The invention of claim 1 wherein the beam is L-shaped in cross section.

28. The invention of claim 1 or 2 or 3 or 4 wherein the leg securing means comprises:
a band configured to encircle the leg; and
means for tightening the band around the leg.

29. The invention of claim 1 or 2 or 4 wherein the machine tool is selected from the group consisting of a jointer, a surface planer, a table saw, a band saw, a band resaw, a shaper, a miter saw, a radial arm saw, a router table, a pin router, and a drill press.

30. The invention of claim 1 or 2 or 4 wherein the machine tool comprises a cutting element, wherein the workpiece is moved past the cutting element along a feed direction, and wherein the beam is oriented parallel to the feed direction.

31. The invention of claim 1 or 2 or 4 wherein the ledge extends along at least about two thirds of the outer portion of the beam.

32. The invention of claim 3 wherein each of the ledges extends along at least about two thirds of the outer portion of the respective beam.

33. The invention of claim 1 or 2 or 4 wherein the ledge extends along the outer portion of the beam for a distance no less than about two feet.

34. The invention of claim 3 wherein each of the ledges extends along the outer portion of the respective beam for a distance no less than about two feet.

35. The invention of claim 2 wherein the beam mounting means comprises:
at least one table extension secured to the machine table and defining a beam support surface coplanar with the reference plane adjacent the machine table; and
means for clamping the inner portion of the beam to the table extension to cantilever the beam from the machine table with the beam plane substantially parallel to the reference plane.

36. The invention of claim 3 wherein each of the beam mounting means comprises:
at least one table extension secured to the respective table and defining a beam support surface coplanar with the respective reference plane adjacent the respective table; and
means for clamping the inner portion of the respective beam to the table extension to cantilever the beam from the respective table with the beam plane substantially parallel with the respective reference plane.

37. The invention of claim 1 or 2 or 4 wherein the machine tool is supported on a support surface, and wherein the leg is supported on the support surface.

38. The invention of claim 3 wherein the jointer is supported on a support surface, and wherein each of the legs is supported on the support surface.

39. The invention of claim 1 or 2 or 4 wherein the machine tool comprises a base, and wherein the leg is supported on the base.

40. The invention of claim 3 wherein the jointer comprises a base, and wherein each of the legs is supported on the base.

41. An extension table for a machine tool of the type that comprises a machine tool that comprises a machine table that is substantially fixed during processing of a workpiece, said table defining a workpiece feed direction and a reference plane, said extension table comprising:
- a beam having a lower surface which defines a beam plane, said beam comprising an inner portion and an outer portion;
- a ledge mounted to the lower surface of the outer portion of the beam to extend outwardly from at least one side of the beam, said ledge extending along the feed direction along the beam for a distance of at least about two feet to support the workpiece continuously as it slides on the ledge along the feed direction;
- means for mounting the inner portion of the beam on the machine table with the beam positioned above the reference plane such that the outer portion of the beam is cantilevered from the machine table with the beam plane substantially parallel with the reference plane;
- said beam having sufficient rigidity to ensure that the upper surface of the ledge is maintained substantially coplanar with the reference plane when the beam is loaded only with the ledge.

42. The invention of claim 41 wherein the lower surface of the inner portion of the beam rests directly on the machine table.

43. The invention of claim 41 wherein the beam mounting means accommodates lateral adjustment of the position of the beam on the table transverse to the feed direction.

44. A method of installing an extension table on a machine tool of the type that comprises a machine table that is substantially fixed during processing of a workpiece and that defines a reference plane said method comprising the following steps:
(a) providing an extension table comprising:
- a beam having a lower surface which defines a beam plane, said beam comprising an inner portion and an outer portion;
- a ledge mounted to the lower surface of the outer portion of the beam to extend outwardly from at least one side of the beam, said ledge defining an upper surface substantially parallel with the beam plane;
- said beam having sufficient rigidity to ensure that the upper surface of the ledges maintained substantially coplanar with the reference plane when the beam is loaded only with the ledge;
(b) mounting the inner portion of the beam on the machine table with the beam positioned above the reference plane such that the outer portion of the beam is cantilevered from the machine table with the beam plane substantially parallel to the reference plane thereby automatically aligning the upper surface of the ledge with the reference plane;
(c) positioning a leg on a support surface beneath the beam; and then
(d) securing the leg to the outer portion of the beam to support the beam against downward deflection when loaded with a workpiece.

45. The method of claim 44 wherein the machine tool defines a feed direction, and wherein the inner portion of the beam is mounted to the machine table in step (b) such that the ledge extends along the feed direction to support the workpiece as the workpiece is moved along the feed direction.

46. The method of claim 44 wherein the support surface supports the machine tool.

47. In combination with a machine tool of the type that comprises a machine table having an upper surface that defines a reference plane, and a cutting element for removing material from a workpiece supported on the machine table, the improvement comprising:
- first and second beams, each having a respective lower surface which defines a respective beam plane, each beam comprising a respective inner portion and a respective outer portion;
- first and second ledges, each mounted on the lower surface of the outer portion of the respective beam to extend outwardly from at least one side of the respective beam, each ledge defining an upper surface substantially parallel with the respective beam plane;
- a beam mounted assembly secured to the machine table to rest on the upper surface, said beam mounting assembly defining first and second beam mounting surfaces oriented parallel with one another on opposed sides of the cutting element;
- means for securing the inner portion of the first beam on the first beam mounting surface with the first beam positioned on the table above the reference plane such that the outer portion of the first beam is cantilevered from the table with the first beam plane substantially parallel with the reference plane;
- means for securing the inner portion of the second beam on the second beam mounting surface with the second beam positioned on the table above the reference plane such that the outer portion of the second beam is cantilevered from the table with the second beam plane substantially parallel with the reference plane;
- said beams having sufficient rigidity to ensure that the upper surfaces of the first ad second ledges are substantially coplanner with the reference plane when the beams are loaded only with the ledges.

48. The invention of the claim 47 wherein the machine tool is selected from the group consisting of a miter saw and a shaper.

49. The invention of claim 47 wherein the beam mounting assembly is yoke shaped.

50. The invention of claim 47 further comprising:
- a pair of legs; and
- means for adjustably securing a respective one of the ledges to the outer portion of each of the beams to support the beams against downward deflection when loaded with the workpiece.

51. The invention of claim 47 wherein each of the beams is rectangular in cross section and defines four axially extending T slots, each on a respective face of the beam.

52. The invention of claim 47 wherein each of the ledges extends along the outer portion of the respective beam for a distance no less than about two feet.

53. The invention of claim 14 wherein the fence defines first and second ends, wherein the machine tool comprises means for adjustably securing the first end of the fence in place with respect to the machine table, and wherein the invention further comprises:

a restraint rail mounted to the machine table below and adjacent the second end of the fence; and means, secured to the second end of the fence, for engaging the restraint rail to restrain the second end of the fence against upward movement without interfering with horizontal movement of the second end of the fence.

54. The invention of claim 53 wherein the rail engaging means comprises a roller mounted to roll along a lower surface of the restraint rail.

* * * * *

UNITED STATES PATENT AND TRADEMARK OFFICE
CERTIFICATE OF CORRECTION

PATENT NO. : 4,817,693
DATED : April 4, 1989
INVENTOR(S) : Michael J. Schuler

It is certified that error appears in the above-identified patent and that said Letters Patent is hereby corrected as shown below:

IN THE CLAIMS

In column 17, line 42, please delete "defies" and substitute therefor --defines--.

In column 21, line 46, after "plane" please insert --,--.

In column 22, line 23, please delete "on" and substitute therefor --to--.

In column 22, line 49, please delete "ad" and substitute therefor --and--.

In column 22, line 62, please delete "ledges" and substitute therefor --legs--.

Signed and Sealed this

Twelfth Day of May, 1992

Attest:

DOUGLAS B. COMER

*Attesting Officer*  *Acting Commissioner of Patents and Trademarks*